United States Patent
Kim et al.

(10) Patent No.: US 8,582,282 B2
(45) Date of Patent: Nov. 12, 2013

(54) DISPLAY APPARATUS

(75) Inventors: Heejin Kim, Pyeongtaek-si (KR); Sangdon Park, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 319 days.

(21) Appl. No.: 13/031,985

(22) Filed: Feb. 22, 2011

(65) Prior Publication Data

US 2011/0222218 A1    Sep. 15, 2011

Related U.S. Application Data

(60) Provisional application No. 61/313,873, filed on Mar. 15, 2010.

(30) Foreign Application Priority Data

Mar. 15, 2010  (KR) .................. 10-2010-0022936
Mar. 17, 2010  (KR) .................. 10-2010-0023631

(51) Int. Cl.
*G06F 1/16*    (2006.01)

(52) U.S. Cl.
USPC ............... 361/679.21; 361/679.22; 248/917; 248/918; 348/825; 348/826

(58) Field of Classification Search
USPC ...................................... 361/679.21, 679.22
See application file for complete search history.

(56) References Cited

U.S. PATENT DOCUMENTS

| | | | |
|---|---|---|---|
| 4,167,757 A | | 9/1979 | Kono et al. ................. 358/254 |
| 5,754,259 A | * | 5/1998 | Nakamatsu et al. .......... 348/835 |
| 6,575,541 B1 | * | 6/2003 | Hedrick et al. ............ 312/223.1 |
| 6,578,972 B1 | * | 6/2003 | Heirich et al. ............... 359/608 |
| 6,795,131 B1 | * | 9/2004 | Jung ........................... 348/836 |
| 6,870,582 B2 | * | 3/2005 | Hayashimoto et al. ......... 349/58 |
| 7,466,540 B2 | * | 12/2008 | Takahashi et al. ....... 361/679.27 |
| 8,031,463 B2 | * | 10/2011 | Yukawa et al. .......... 361/679.21 |
| 8,368,822 B2 | * | 2/2013 | Suzuki et al. ................. 348/836 |
| 8,369,107 B2 | * | 2/2013 | Cho et al. ...................... 361/829 |
| 2006/0077629 A1 | * | 4/2006 | Shiraishi ....................... 361/681 |
| 2006/0209527 A1 | * | 9/2006 | Shin ............................ 362/29 |
| 2006/0238446 A1 | * | 10/2006 | Takahashi et al. .............. 345/55 |
| 2007/0216702 A1 | * | 9/2007 | Takahashi et al. ............ 345/582 |

(Continued)

FOREIGN PATENT DOCUMENTS

CN    101377578 A    3/2009
CN    101435954 A    5/2009

(Continued)

OTHER PUBLICATIONS

European Search Report dated Sep. 8, 2011 issued in Application No. 11 15 2628.

(Continued)

*Primary Examiner* — Anthony Q Edwards
(74) *Attorney, Agent, or Firm* — KED & Associates, LLP

(57) ABSTRACT

Disclosed with are a display apparatus. The apparatus includes a display module; a front panel disposed on a front of the display module; a first supporting member including a plurality of surfaces formed in directions perpendicular to each other, a first surface of the plurality of surfaces being fixed to the front panel and a second surface being fixed to the display module; and a bezel formed on an outer edge region of the display apparatus to surround a edge of the front panel.

21 Claims, 30 Drawing Sheets

(56) References Cited

U.S. PATENT DOCUMENTS

| | | | |
|---|---|---|---|
| 2008/0158799 A1* | 7/2008 | Tai et al. | 361/681 |
| 2008/0297999 A1* | 12/2008 | Choi | 361/681 |
| 2009/0058235 A1 | 3/2009 | Uchimi | 312/114 |
| 2011/0221980 A1* | 9/2011 | Kawabata et al. | 348/794 |

FOREIGN PATENT DOCUMENTS

| | | |
|---|---|---|
| EP | 1 795 947 A1 | 6/2007 |
| EP | 2 159 999 A1 | 3/2010 |
| FR | 1 241 067 A | 9/1960 |
| KR | 10-2008-0071637 A | 8/2008 |
| KR | 10-2009-0016972 A | 2/2009 |
| WO | WO 03/063476 A1 | 7/2003 |
| WO | WO 2010/143831 A1 | 12/2010 |

OTHER PUBLICATIONS

European Search Report dated Apr. 27, 2011 issued in Application No. 11 15 2628.

Chinese Office Action dated Jan. 28, 2013 issued in Application No. 201110059537.1.

* cited by examiner (a)

(b)

DISPLAY APPARATUS

CROSS REFERENCE TO RELATED APPLICATION

This application claims the benefit of Korean Patent Application Nos. 10-2010-0023631 (Filed on Mar. 17, 2010) and 10-2010-0022936 (Filed on Mar. 15, 2010), and U.S. Provisional Application No. 61/313,873 filed Mar. 15, 2010, which are incorporated herein by reference.

BACKGROUND OF THE INVENTION

1. Technical Field

The present invention relates to a display apparatus.

2. Description of the Related Art

With the development of information society, demands for display apparatus have been increased in various ways and a variety of display apparatuses have been correspondingly studied and used in recent years, including a Liquid Crystal Display apparatus (LCD), a Plasma Display Panel (PDP), an Electro Luminescent Display (ELD), a Vacuum Fluorescent Display (VFD).

Among others, the liquid crystal panel of the LCDs includes a liquid crystal layer, and a TFT substrate and a color filter substrate facing each other with the liquid crystal layer therebetween and cannot emit light by itself, so that it can display video with the use of light provided from a backlight unit.

SUMMARY OF THE INVENTION

An object of embodiments according to the present invention is to provide the structure of a display apparatus that improves the stability and appearance of the display apparatus.

According to an aspect of the present invention, there is provided a display apparatus, including: a display module; a front panel disposed on a front of the display module; a first supporting member including a plurality of surfaces formed in directions perpendicular to each other, a first surface of the plurality of surfaces being fixed to the front panel and a second surface being fixed to the display module; and a bezel formed on an outer edge region of the display apparatus to surround a edge of the front panel.

According to another aspect of the present invention, there is provided a display apparatus, including: a display module; a front panel disposed on a front of the display module; a first supporting member and having an edge part formed to be curved in a rear side; and a first supporting member fixed to the display module on one side thereof, wherein the edge part of the front panel has a reflective region, of which a external surface is convex.

DESCRIPTION OF THE PREFERRED EMBODIMENTS

Figure 1:
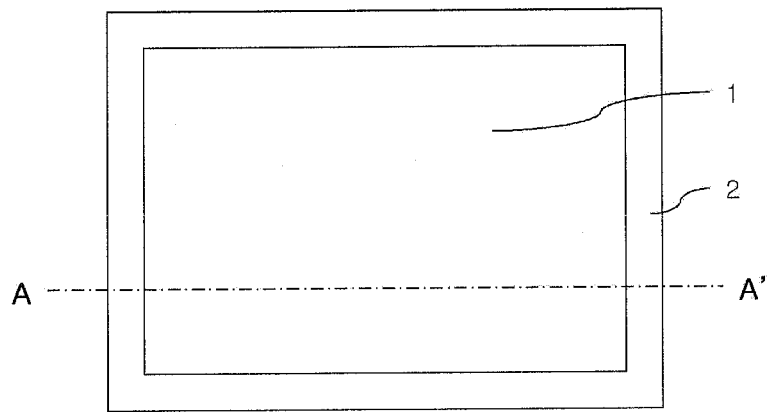
FIG. 1 is a diagram schematically showing the shape of the front of a display apparatus.

A display apparatus and a control method thereof according to embodiments of the present are described below with accompanying drawings.

The present invention is described hereafter with reference to the accompanying drawings. The embodiment described hereafter can be modified in various ways and the technical spirit of the embodiments is not limited to the following description. The embodiments are provided for those skilled in the art to fully understand the present invention. Accordingly, the shape, the size, etc., of the elements in the drawings may be exaggerated for explicit comprehension.

FIG. 1 is a diagram schematically showing the display area and non-display area of a display apparatus, which shows the front surface of the display apparatus, that is, the shape viewed from a user.

Referring to FIG. 1, the display apparatus may include a display area 1 where images are displayed and a non-display area 2 where images are not displayed. The non-display area 2, which has a shape surrounding the display area 1, is formed in the outer edge region of the display apparatus and the non-display area 2 may have a light shielding pattern formed thereon.

The light shielding pattern formed in the non-display area 2 can shield light from passing through the outer edge region of the display apparatus, such that except for images to be displayed, structures provided in the outer edge region of the display apparatus, etc., cannot be seen by the user side.

In order for the light shielding pattern formed in the non-display area 2 may have black color to effectively shield light and may be, for example, a black layer printed with black. As a result, when being seen from the user side, the non-display area 2 of the display apparatus may be shown as black color.

Figure 2:
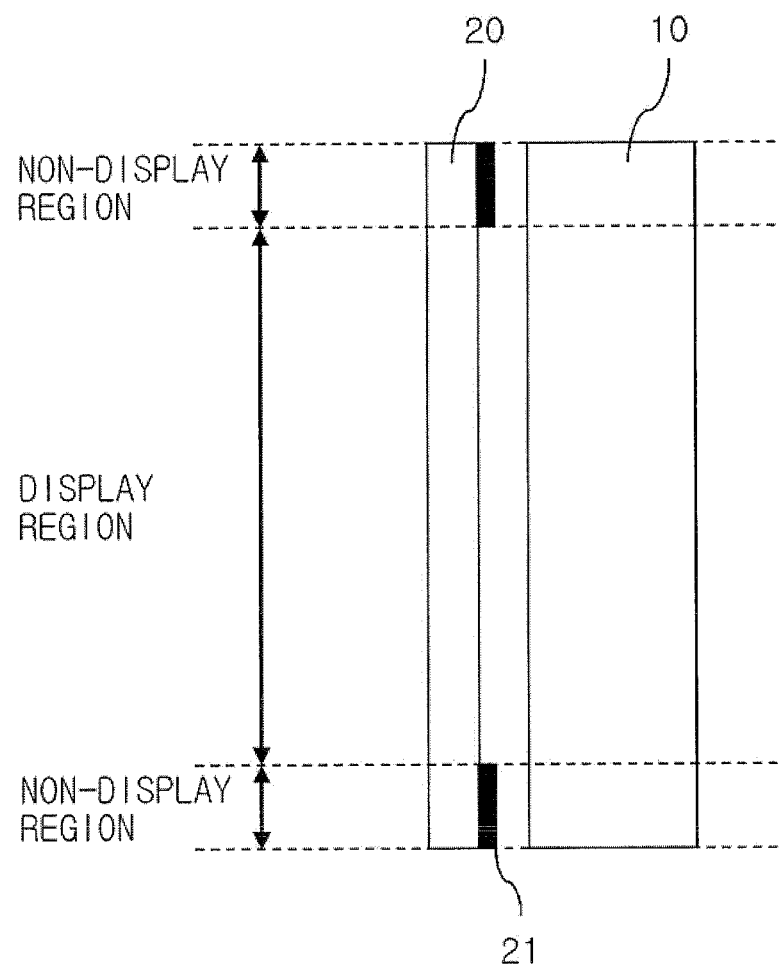
FIG. 2 is a cross-sectional view schematically showing a configuration of a display apparatus.

FIG. 2 is a cross sectional view showing an embodiment of the configuration of the display apparatus. The display apparatus includes a display module 10, a front panel 20 and a light-shielding pattern 21.

Referring to FIG. 2, the display module 10 emits light in a front direction where the front panel 20 is disposed, thereby displaying video. For example, the display module 10 may be a liquid crystal display module and may include a liquid crystal panel shown) and a backlight unit (not shown). The liquid crystal panel (not shown) can display images using light provided from the backlight unit (not shown). To this end, the liquid panel (not shown) may include a liquid crystal layer and a TFT substrate and a color filter substrate that faces each other, putting the liquid crystal layer therebetween.

However, the embodiments according to the present invention are not limited to the above-mentioned liquid crystal display apparatus and can be applied to various display apparatuses, such as a plasma display panel (PDP), an electro luminescent display (ELD), a vacuum fluorescent display (VFD), etc.

The front panel 20 is disposed at the front side of the display module 10 at a predetermined distance, protects the display module from an external impact, and transmits light emitted from the display module 10 so that images displayed in the display module 10 can be seen from the external.

For example, the front panel 20 may be made of a glass material or a plastic material, such as PC (polycarbonate), etc., having impact resistance and light transmission.

As shown in FIG. 2, the front panel 20 may include the display area 1 that transmits light emitted from the display module 10 and displays images and the non-display area 2 surrounding the display area and a light shielding pattern 21 that shields light may be formed in the non-display area 2.

Meanwhile, when a power supply of the display apparatus is turned-off, the display area 1 where images are not displayed may be shown as black color similar to the non-display area 2 At this time, however, the reflection, absorption, scattering, etc., of external light incident from the outside may be differently generated in the display area 1 and the non-display area 2.

For example, some of the external light may be reflected by the display panel, etc., provided in the display area 1 and most external light may be absorbed in the non-display area 20 on which the black layer is printed. As a result, when the power supply is turned-off, a visual difference can occur between the display area 10 and the non-display area 20 of the display apparatus. The above-mentioned visual difference may be distinctly displayed, in particular, at a boundary part of the display area 1 and the non-display area 2.

In the display apparatus according to an embodiment of the present invention, a metal film layer (not shown) may be formed on one surface of the front panel 20 to overlap with the light shielding pattern 21. That is, the light shielding pattern 21 and the metal film layer (not shown) may be formed on the non-display area 2 of the front panel 20 to overlap each other.

The metal film layer (not shown) may be formed by depositing a metal, such as nickel (Ni) or aluminum (Al), onto one surface of the front panel 20.

The metal film layer (not shown) simultaneously has a reflection property and a light-transmitting property for light due to a metal characteristic and a thin film characteristic of, so that the metal film layer can reflect some of external light incident from outside and transmit some of the external light.

The light shielding pattern 21 may be a black layer printed in black color and may be configured by forming a black printed layer, for example, on the metal film layer (not shown) formed on the first surface of the front panel 20.

As described above, as the metal film layer 200 has a reflection property and a light-transmitting property, some of external light incident on the non-display area is reflected by the metal film layer 200 and is again emitted to the front surface, that is, a user, and some of the rest of the external light incident on the non-display area may be transmitted to the metal thin layer 200 and absorbed by the light shielding pattern 120.

According to the above-described configuration, the reflection of external light occurring in the display area of the display apparatus may occur even in the non-display area, more particular, in the metal film layer (not shown) formed in the non-display area.

Furthermore, since some of the external light incident on the non-display area is transmitted to the metal film layer (not shown) and then absorbed by the light shielding pattern 21, for example, the printed black layer, the absorption of external light occurring in the display area also occurs in the non-display area, so that both the display area and the non display area may be shown as black color.

Figure 3:
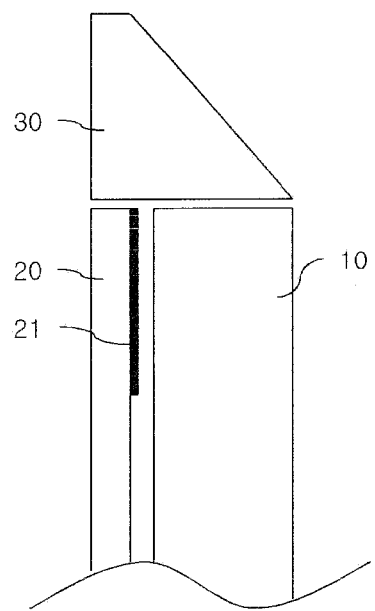
FIG. 3 is a block diagram showing the configuration of a display apparatus according to a first embodiment of the present invention.

Accordingly, when the display apparatus is viewed form its front, similar visual reflection may be perceived with respect to the display area and the non-display area, due to which the visual difference between the display area 1 and the non-display area may be decreased FIG. 3 is a cross sectional view showing the configuration of a display apparatus according to a first embodiment of the present invention.

According to this embodiment of the present invention, a bezel 30 may be formed on the outer edge region of the display apparatus to surround the edge of the front panel 20. As shown in FIG. 3, the bezel 30 may include a part having a width which gradually decreases toward the rear side thereof, and the cross sectional shape of the bezel 30 may be, for example, a trapezoidal shape.

Meanwhile, the bezel 30 may have a light-transmitting property, and, for this, may be made of a transparent material, for example, a plastic material, such as polycarbonate (PC), acrylic, etc., or a glass material.

More specifically, the bezel 30 may be made of a material identical to that of the front panel 20 or may be a separate structure made of a material different from that of the front panel 20.

As described above, since the transparent bezel 30 has the cross sectional shape having a part whose width gradually decreases, such as a trapezoidal shape, etc., light incident from the rear of the display apparatus, more particular, from the rear or side of the bezel 30 may be diffused or refracted toward the front of the display apparatus due to prism effect or the like.

When, for example, external light or light emitted from a separate light source, such as light emitting diode (LED) or the like, is incident on the rear surface of the transparent bezel 30, the incident light may be diffused or refracted to the front surface of the display apparatus by the transparent bezel 30 having more than two optical planes which are not parallel to each other as shown in FIG. 3 and the light diffused or refracted to the front surface as described above is shown to a user, thereby additionally improving the appearance of the display apparatus.

The shape of the bezel 30 as shown in FIG. 3 is merely an embodiment according to the present invention and, therefore, the present invention is not limited thereto. For example, the bezel 30 may have various shapes, for example, having two optical planes which are not parallel to each other and in which light incident from the rear or the side is diffused or refracted as described above.

Furthermore, as shown in FIG. 3, bezel 30 forms the external appearance of the front of the display apparatus according to this embodiment of the present invention in cooperation with the front panel 20 and, for example, the front surface of the front panel 20 and the front surface of the bezel 30 may be substantially disposed on the same plane.

Embodiments for the configurations of the front panel 20 and the bezel 30 included in the display apparatus will be described in detail below with reference to FIGS. 4 to 11.

Figure 4:
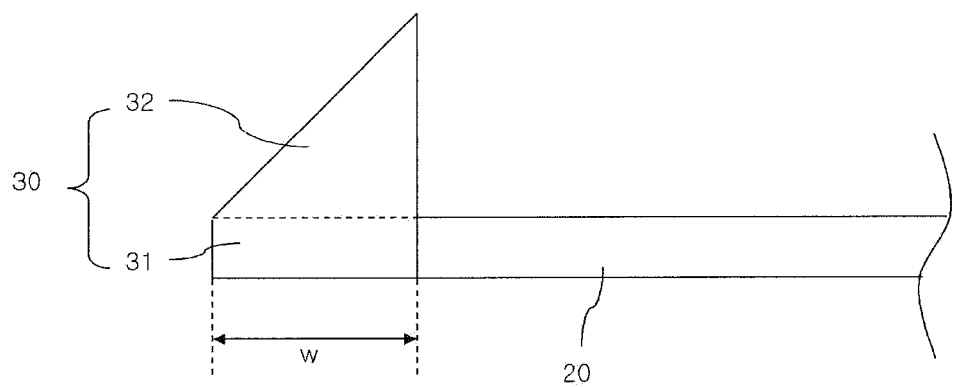
FIGS. 4 to 11 are cross-sectional views showing embodiments for a front panel and a bezel included in the display apparatus.

Referring to FIG. 4, the bezel 30 formed in the outer edge region of the display apparatus may be configured to include a first region 31 whose width is uniform and a second region 32 whose width gradually decreases toward the rear thereof. Furthermore, the first region 31 having a uniform width (w) may be located disposed further ahead than the second region 32, which allows the display apparatus to be shown as being more slim in addition to the diffusion or refraction of light According to another embodiment of the present invention, a seating groove 33 in which the front panel 20 is seated may be formed in the bezel 30, and as the front panel 20 is supported by and fixed to the seating groove 33, stable fixation is possible between the front panel 20 and the bezel 30.

Figure 5:
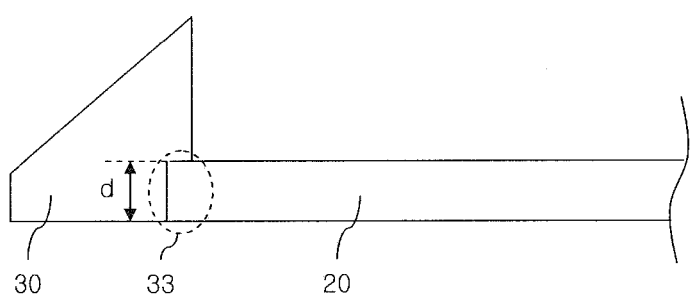

Referring to FIG. 5, the front panel 20 is seated in the seating groove 33 formed in the bezel 30 thereby supporting the edge of the front panel 20. For this, the depth d of the seating groove 33 may be identical to or greater than the thickness of the front panel 20.

Figure 6:
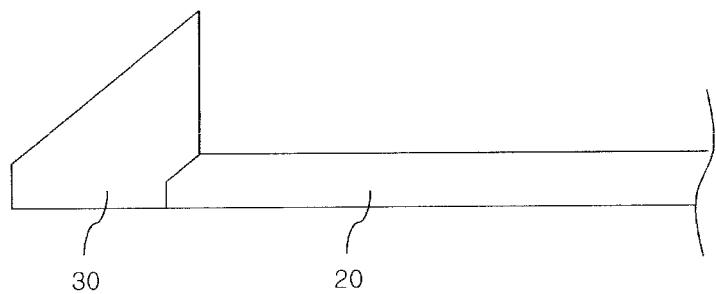

Meanwhile, as shown in FIG. 6, at least a part of the seating groove 33 may have a shape whose width gradually decreases toward the rear thereof such as a trapezoidal cross sectional shape and, therefore, the edge of the front panel 20 may have a trapezoidal cross sectional shape so as to correspond to the shape of the seating groove 33.

Figure 7:
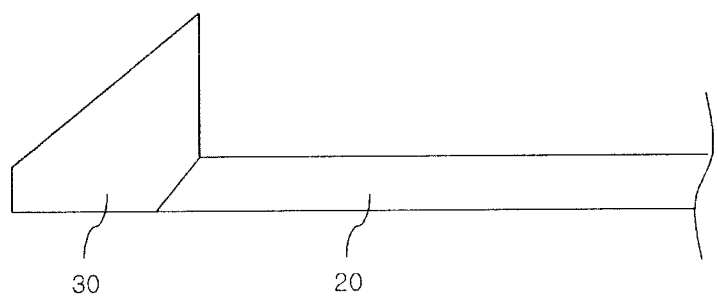

Meanwhile, as shown in FIG. 7, at least a part of the seating groove 33 may have a triangular cross sectional shape and, therefore, the edge of the front panel 20 may have a triangular cross sectional shape so as to correspond to the shape of the seating groove 33.

As described above, since the seating groove 33 to support the edge of the front panel 20 is formed in the bezel 30, the bezel 30 can be firmly fixed to the front panel 20 and, at the same time, the joint clearance between the bezel 30 and the front panel 20 can be decreased.

Figure 8:
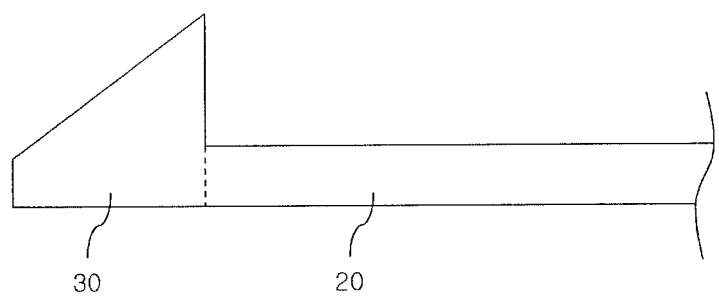

Meanwhile, the bezel 30 and the front panel 20 may be integrally formed as shown in FIG. 8. In this case, the bezel 30 and the front panel 20 may be made of the same transparent material.

Figure 9:
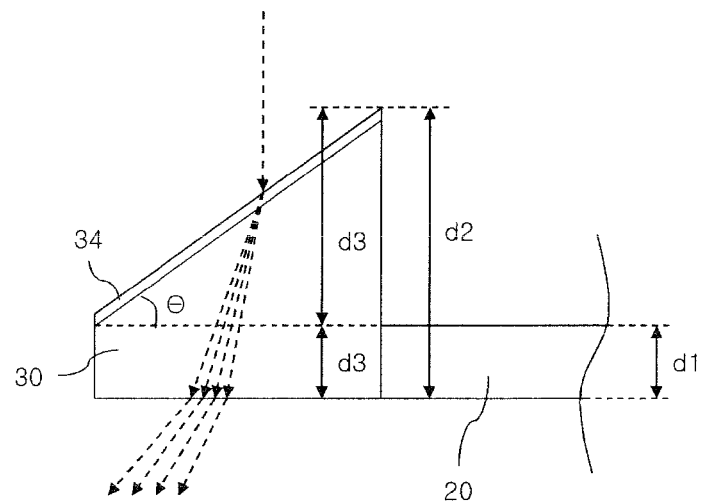

FIG. 9 shows a cross sectional view of another embodiment for the configuration of the bezel 30. In the configuration of the bezel 30 and the panel 40 shown in FIG. 9, the same parts as those described with reference to FIGS. 3 to 8 are not described below.

Referring to FIG. 9, light incident from the rear of the bezel 30, for example, external light may be diffused or refracted at the rear surface and front surface of the bezel 30 which is not parallel to each other and, as described above, the light diffused or refracted toward the front surface is emitted toward a front side, thereby improving the appearance of the display apparatus.

As described above, in order to not only surround the outer edge region of the display apparatus but alto diffuse or refract light due to a prism effect, the thickness of the bezel 30, that is, the thickness d2 of the thickest part of the bezel 30 is preferably larger than the thickness d1 of the front panel 2.

Furthermore, as the thickness d2 of the bezel 30 increases, the thickness of the whole display apparatus may increase, and as the thickness d2 of the bezel 30 decreases, the diffusion and refraction effects of the incident light as described above may be degraded.

Accordingly, in order to improve the appearance of the display apparatus and, at the same time, not to greatly increase the thickness of the display apparatus according to the diffusion and refraction effects of light, the thickness d2 of the bezel 30 may be 2.7 times to 6.5 times the thickness d1 of the front panel 20.

Meanwhile, as the tilt angle Θ of the second region 32 of the bezel 30, in which its width gradually decreases and a tilted rear surface is formed, increases, the whole thickness of the display apparatus increases, and as the tilt angle Θ decreases, the diffusion and refraction effects of the incident light as described above may be degraded.

Accordingly, in order to improve the appearance of the display apparatus according to the diffusion and refraction effects of light without greatly increasing the thickness of the display apparatus, the tilt angle Θ of the second region 32 of the bezel 30 maybe 45 degrees to 60 degrees.

Furthermore, considering the thickness ratio d2/d1 of the bezel 30 and the front panel 20 and the tilt angle Θ of the second region 32, the thickness d3 of the thickest part of the second region 32 of the bezel 30 may be 1.7 times to 5.5 times the thickness d3 of the thickness of the first region 31.

According to another embodiment of the present invention, a pattern 34 having a specific pattern may be formed in the rear surface of the bezel 30. As described above, as the pattern 34 is formed on the rear surface of the bezel 30, light that is diffused or refracted by the bezel 30 and emitted may represent the specific pattern by the pattern 34, For example, the pattern 34 may be formed by carving a specific pattern shape using a mold on the back surface of the bezel 30. Light is incident on the pattern 34 carved in a specific pattern using a mold and then diffused and refracted, so that a user can view the pattern corresponding to the pattern 34 on the front surface of the display apparatus.

Figure 10:
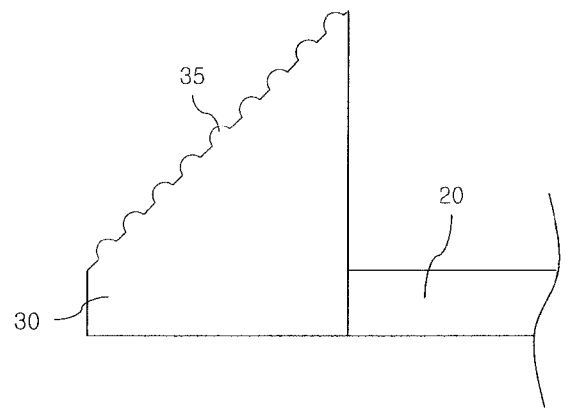
Figure 11:
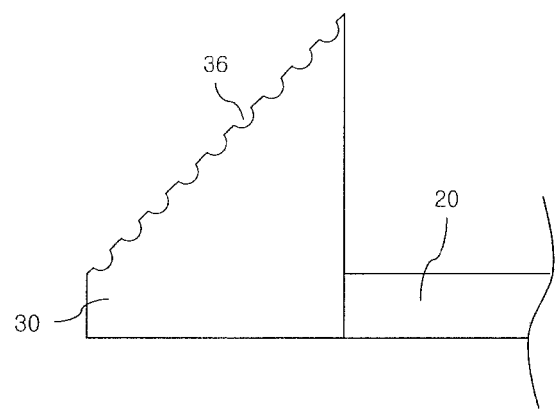

Referring to FIG. 10, a plurality of convex patterns 35 may be formed by treating the rear surface of the bezel 30 using injection. Meanwhile, referring to FIG. 11, a plurality of concave patterns 35 may be formed by treating the rear surface of the bezel 30 using injection.

As described above, light incident on the back surface of the bezel 30 may be scattered by the convex or concave patterns 35 or 36 and, therefore, a user can view a more natural light on the front surface of the display apparatus.

Figure 12:
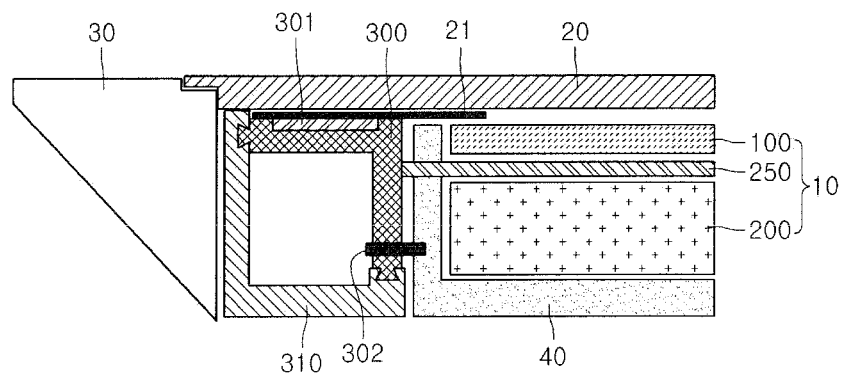
FIG. 12 is a cross sectional view showing the configuration of the display apparatus according to the second embodiment of the present invention.

FIG. 12 is a cross sectional view showing the configuration of a display apparatus according to a second embodiment of the present invention, and the configuration of the display apparatus shown in FIG. 12, the same parts as those described with reference to FIGS. 1 to 11 are not described below.

According to an embodiment, a supporting member to fix the front panel 20 to the front surface of the display module 10 may be formed on the side of the display module 10.

Referring to FIG. 12, the display module 10 may include a display panel 100, a backlight unit 200 and a optical sheet, and a back cover 40 may be located on the rear of the display module 10.

Meanwhile, a first supporting member 300 to fix the front panel 20 to display module 10 may be located on the side of the display module 10.

More specifically, the first supporting member 300 may be bonded to the front panel 20, in which the light-shielding pattern 301 is formed, using a bonding member 301 and may be connected to the display module 10 using a fixing member 302.

As described above, the front panel 20 can be supported on and fixed to the front surface of the display module 10 by the first supporting member 300, the bonding member 301 and the fixing member 302, and the entire thickness of the display apparatus can be reduced by decreasing the interval between the display module 10 and the front panel 20.

For example, the first supporting member 300 may be a bar extruded in letter 'L' using a metal, such as aluminum (Al) or the like, thereby improving the fixation between the display module 10 and the front panel 20 and the rigidity of the display apparatus. Meanwhile, the fixing member 302 to fix the display module 10 to the first supporting member 300 may be a screw formed to pass through the first supporting member 300.

Furthermore, the rear surface of the front panel 20 may be treated using etching or film laminating in order to prevent stain.

Meanwhile, in the display apparatus according to the embodiment of the present invention, the second supporting member 310 that forms the rear surface of the display apparatus along with the back cover 40 by being coupling to the first supporting member 300 may be located.

The second supporting member 310 is coupled to the first supporting member 300, thereby improving the rigidity of the display apparatus and, at the same time, preventing the first supporting member 300, the fixing member 302 and the like from being exposed in the rear surface. The second supporting member 310 may be a bar extruded in letter 'L' and made of a metal, such as aluminum or the like, like the first supporting member 300.

Meanwhile, the transparent bezel 30 may be formed to surround the second supporting member 300 in the outer edge region of the display apparatus and may be coupled and fixed to the front panel 20 using the seating grooves 33.

As shown in FIG. 12, the width d of the seating grooves 33 formed in the bezel 30 may be smaller than the thickness d1 of the front panel 20.

An embodiment of a method of manufacturing the display apparatus shown in FIG. 12 is described with reference to FIGS. 13A to 13H.

Figure 13A:
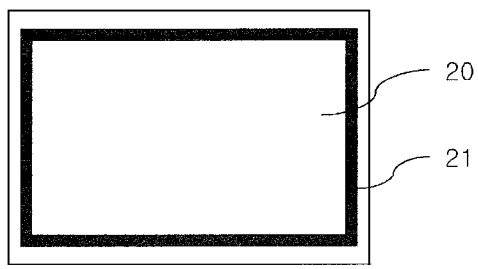
FIGS. 13A to 13H are diagram showing an embodiment of a method of manufacturing the display apparatus shown in FIG. 12.

Referring to FIG. 13A, the light-shielding pattern 21 may be formed by printing a black layer on the outer edge region of the rear surface, for example, non-display area of the front panel 20 made of a transparent material, such as PC.

Figure 13B:
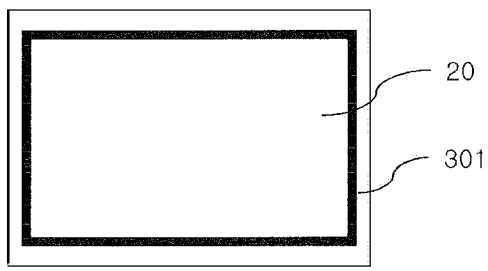

Thereafter, as shown in FIG. 13B, a bonding member 301 to which the first supporting member 300 can bonding and fixed may be formed by coating adhesive on the rear surface of the front panel 20 in which the light-shielding pattern 21 is formed.

As shown in FIG. 12, the region in which the bonding member 301 is formed may overlap with the region in which the light-shielding pattern 21 is formed, and for example, the adhesive may be coated on the region in which the light-shielding pattern 21 is formed.

Figure 13C:
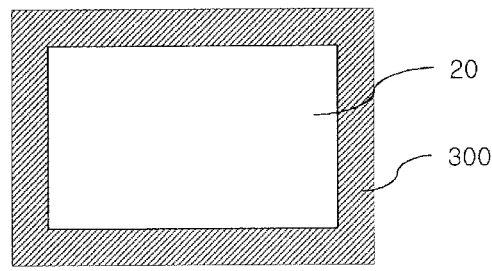

Referring to FIG. 13C, the first supporting member 300 may be bonded and fixed to the rear surface of the front panel 20 in which the bonding member 301.

Figure 13D:
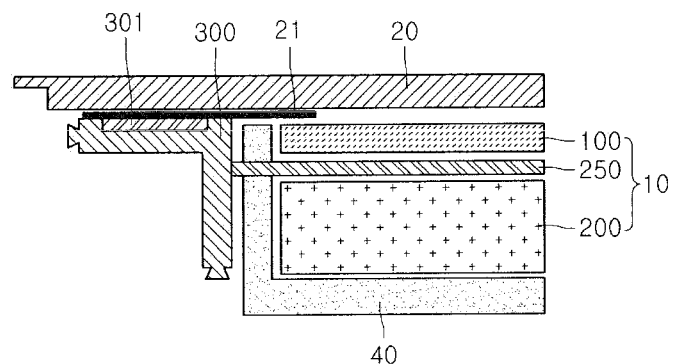
Figure 13E:
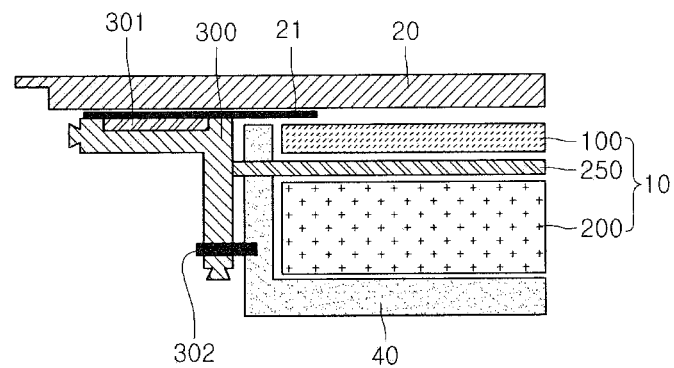

Furthermore, as shown in FIG. 13D, the display module 10 fixed to the back cover 40 is inserted into and located in the inside of the region in which the first supporting member 300 is formed and, thereafter the side of the display module 10 can be fixed to the first supporting member 30 using the fixing member 302, such as a screw, as shown in FIG. 13E.

Figure 13F:
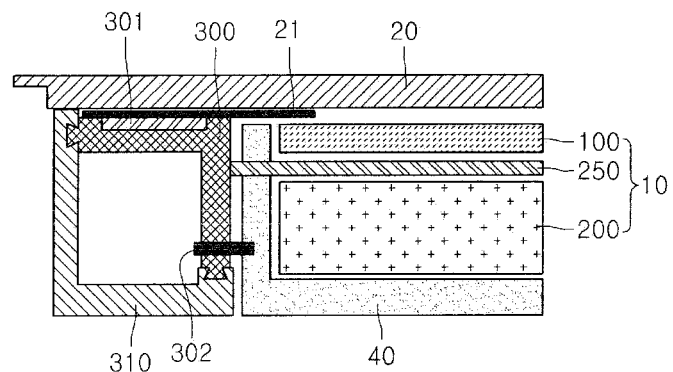

Referring to FIG. 13F, the second supporting member 301 is coupled to the first supporting member 300 to which the display module 10 is fixed in a rear side, thereby firmly fixing the display module 10 and the front panel 20.

Figure 13G:
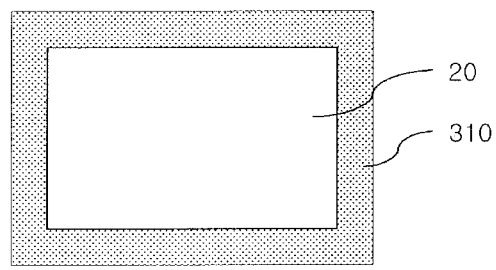
Figure 13H:
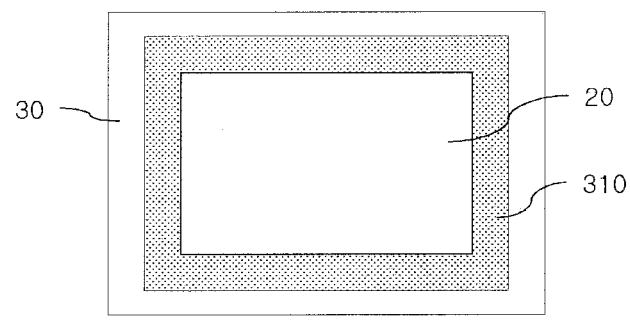

Referring to FIG. 13H, the bezel 30 having the configuration as described above is inserted into and fixed to the edge part of the front panel 20 fixed to the display module 10 by the first and second supporting members 300 as shown in FIG. 13G.

For example, using the seating grooves 33 of the bezel 30 as described above, the bezel 30 is fitted to the edge part of the front panel 20 to couple the front panel 20 to the bezel 30.

Figure 14:
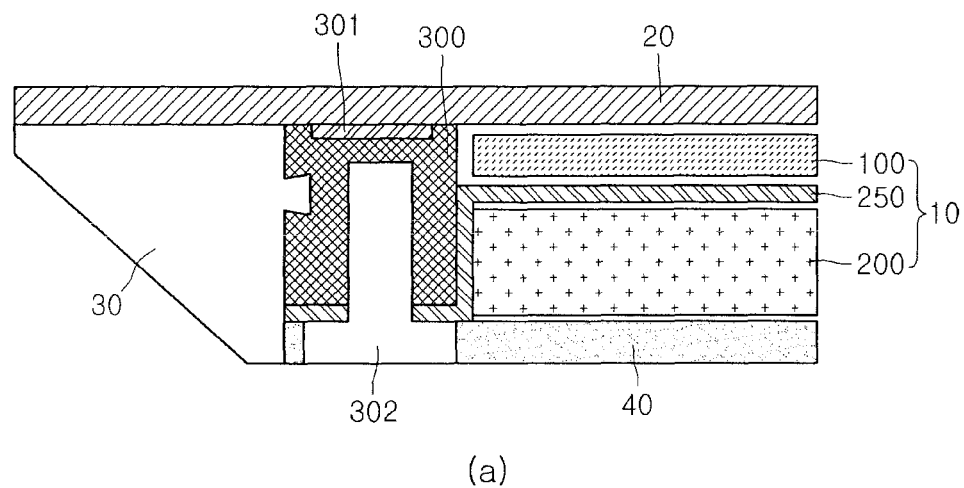
FIG. 14 is a cross sectional view showing the configuration of the display apparatus according to the third embodiment of the present invention.
Figure 14:
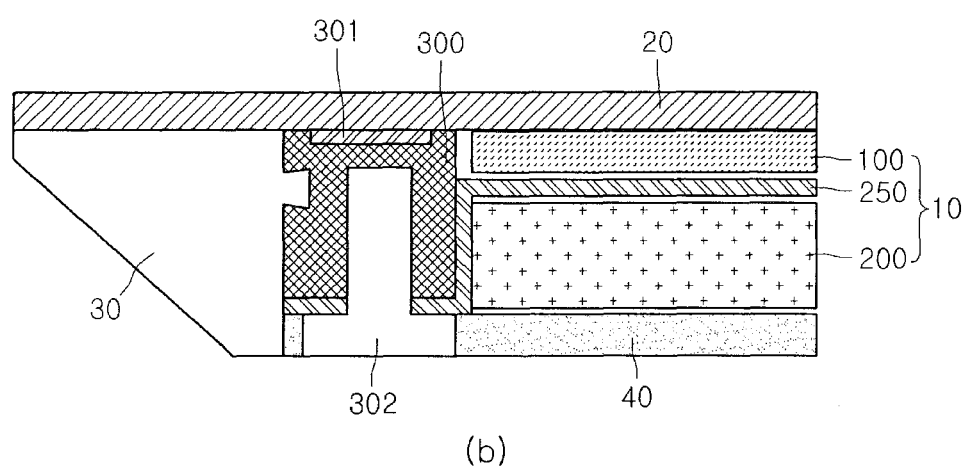

FIG. 14 is a cross sectional view showing the configuration of a display apparatus according to a third embodiment of the present invention, and the configuration of the display apparatus shown in FIG. 14, the same parts as those described with reference to FIGS. 1 to 13 are not described below.

Referring to FIG. 14A, a supporting member 300 to fix the front panel 20 to display module 10 may be located on the side of the display module 10. More specifically, the supporting member 300 may be bonded to the front panel 20 using the bonding member 301.

For example, the supporting member 300 may be a bar extruded in letter 'L' using a metal, such as aluminum (Al) or the like, thereby improving the fixation between the display module 10 and the front panel 20 and the rigidity of the display apparatus.

Meanwhile, according to another embodiment of the present invention, the fixing member 302 to fix the display module 10 to the supporting member 300 to couple the display module 10 to the front panel 20 may be formed to pass through the back cover.

For example, as shown in FIG. 14A, the fixing member 302 may be a screw to pass through the back cover 40 to be coupled to the supporting member 300.

According to another embodiment of the present invention, the front filter 20 may be formed in the front surface of the display apparatus and the bezel 30 may be coupled to the rear of the front panel 20, as shown in FIG. 14A.

Meanwhile, the interval between the display module 10, more specifically, the display panel 100 and the front panel 20 is approximately 0, so that the display panel 100 is disposed in close contact with the front panel 20, as FIG. 14B.

As described above, when the display panel is disposed in close contact with the front panel 20 without clearance, the reflection or refraction of light generated by a air gap between the display panel 100 and the front panel 20.

Figure 15:
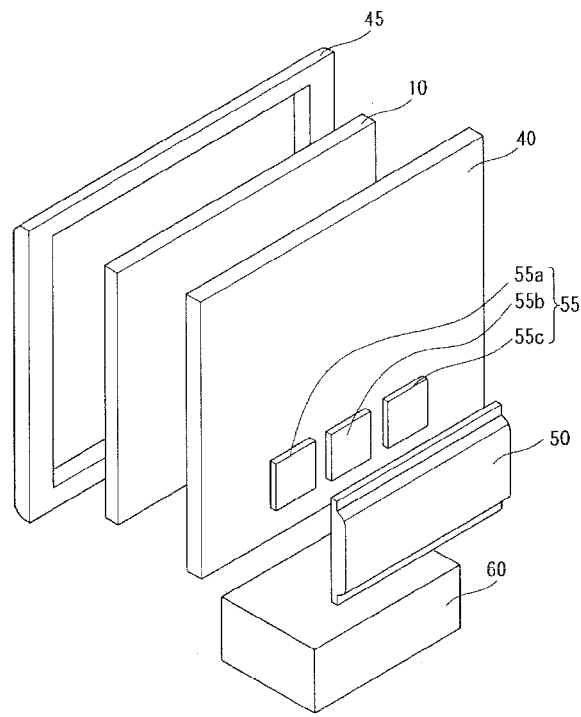
FIGS. 15 and 16 are perspective views showing embodiments for the configuration of the display apparatus according to the present invention.
Figure 16:
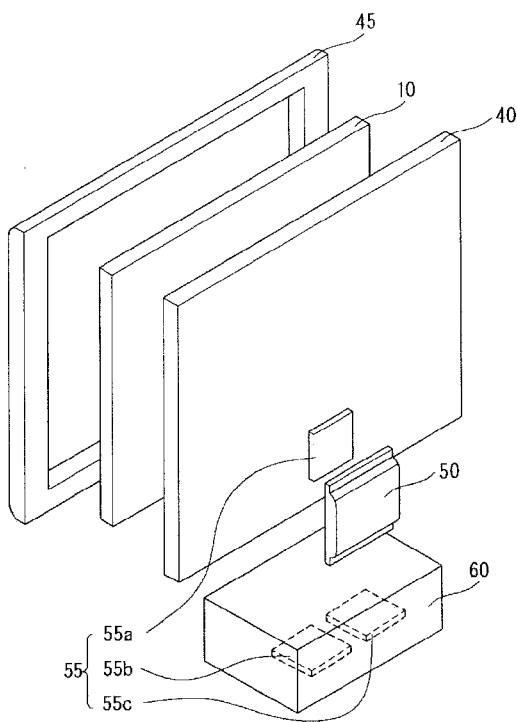

FIGS. 15 and 16 are diagrams showing a display apparatus according to still another embodiment of the present invention.

Referring to FIG. 15, the display apparatus may include a display module 10, a front cover 45 to surround the display module 10, a back cover 40, a driving unit 55 embedded in the back cover 40, and a driving unit cover 50 to surround the driving unit 55.

The front cover 45 may include a transparent front panel that transmits light, and the front panel protects the display module 10 at a certain distance and transmits light emitted from the display module 10 to allow images displayed on the display module 10 to be viewed from the outside.

Furthermore, the front cover 45 may be made of a flat plate having no window. In this case, the front cover 45 is made of a transparent material that transmits light, for example, an injection-molded plastic. In this way, when the front cover 45 is made of a flat plate, it is possible to remove a frame from the front cover 45. The back cover 40 is combined with the front cover 45 to protect the display module 10.

The driving unit 55 may be disposed in one surface of the back cover 40. The driving unit 55 may include a driving control unit 55a, a main board 55b, a power supply unit 55c, and the like. For example, the driving control unit 55a, which may be a timing controller, is a driving unit for controlling operation timings with respect to the respective driver ICs of the display module 20, the main board 55b is a driving unit for delivering V sync, H sync, and R, G and B resolution signals to a timing controller, and the power supply unit 55c is a driving unit for applying power to the display module 10.

The driving unit 55 is provided in the back cover 40 and may be surrounded by the driving unit cover 50. A plurality of holes is provided in the back cover 40 so that the display module 10 and the driving unit 550 can be coupled to each other. Furthermore, a stand 60 to support the display apparatus may be provided.

On the other hand, as shown in FIG. 16, the driving control unit 55a of the driving unit 55 may be provided in the back cover 40, and the main board 55b and the power supply board 55c may be provided in the stand 60. Furthermore, the driving unit cover 50 can cover only the driving unit 55 provided in the back cover 40.

In this embodiment, the main board 55b and the power supply board 55c are separately implemented, but may be implemented by way of an integrated board, and the present invention is not limited thereto.

FIGS. 17 to 35 shows embodiments for the configuration of a backlight unit included in the display apparatus according to embodiments of the present invention.

The display unit 10 may be configured to include a display panel 100 and a backlight unit 200. More specifically, the display module 10 may include the backlight unit 200 that is extended along the display panel 100 and the backlight unit 200 may be located on the lower portion thereof to correspond to an area of the display panel 100 on which images are displayed. For example, the size of the backlight unit 200 may be identical to or similar to the size of the display panel 100.

According to the embodiment of the present invention, the display apparatus may be configured by disposing the backlight unit 200 to be in close contact with to the rear surface of the display panel 100

For example, the backlight unit 200 may be bonded and fixed to the lower surface of the display panel, in detail, to the lower polarizer, and for this configuration, a bonding layer (not shown) may be provided between the lower polarizer and the backlight unit 200.

By disposing the backlight unit 200 be in close contact with the rear surface of the display panel 100, as described above, it is possible to reduce the entire thickness of the display apparatus to improve the external appearance and it is also possible to simplify the structure of the display apparatus and the manufacturing process by removing a structure for fixing the backlight unit 200.

Further, since the space between the backlight unit 200 and the display panel 100 is removed, it is possible to prevent the display apparatus from the display apparatus and the image quality of display images from deteriorating due to foreign substances inserted in the space.

According to the embodiment of the present invention, the backlight unit 200 may be formed by stacking a plurality of function layers and at least one of the function layers may be provided with a plurality of light sources (not shown).

Further, it is preferable that the backlight unit 200, in detail, the layers of the backlight unit 200 are made of a flexible material in order to fix the backlight unit 200 in close contact to the lower surface of the display panel 100, as described above.

According to an embodiment of the present invention, the display panel 100 may be divided into a plurality of blocks and the brightness of the light emitted from a corresponding block of the backlight unit 200, that is, the brightness of a corresponding light source is adjusted in response to the gray peak value or color coordinate signals of the divided block, such that the luminance of the display panel 100 can be adjusted.

For this configuration, the backlight unit 200 may be driven respectively for a plurality of driving regions divided to correspond to the divided regions of the display panel 100.

Figure 17:
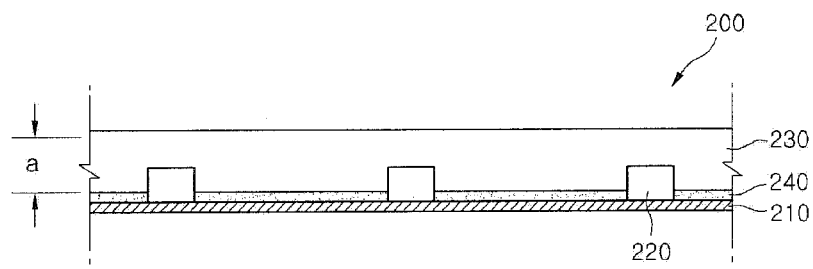
FIGS. 17 to 35 are diagrams showing embodiments for the configuration of a backlight unit included in the display apparatus.

Referring to FIG. 17, the backlight unit 200 may include a first layer 210, light sources 220, a second layer 230 and a reflective layer 240.

Referring to FIG. 17, the light sources 220 may be formed on the first layer 210 and the second layer 230 may be disposed on the first layer to cover the light sources 220. Preferably, the second layer 230 covers entirely the plurality of light sources 220 formed on the first layer 210. Alternatively, the second layer 230 may cover only the specific parts or specific surfaces of the plurality of light sources 220 formed on the first layer 210.

The first layer 210 may be a substrate on which the light sources 220 are mounted and may be provided with an adapter (not shown) supplying power and an electrode pattern (not shown) for connecting the light sources 220. For example, a carbon nanotube electrode pattern (not shown) may be formed on the substrate to connect the light sources 220 with the adapter (not shown).

On the other hand, the first layer 210 may be a PCB (Printed Circuit Board) that is made of polyethylene terephthalate, glass, polycarbonate, and silicon etc. to mount the light sources 220 in a film shape.

The light sources 220 may be one of a Light Emitting Diode (LED) chip and an LED package in which at least one LED is included. In this embodiment, description is given assumption that the light emitting diode package is provided as the light source 220.

Meanwhile, the LED package constituting the light source 220 may be classified into a top view type LED package and a side view type LED package according to a direction in which a light emitting surface is directed. The light source 220 according to the embodiment of the present invention may be implemented using at least one of the top view type LED package in which the emitting surface is the upper side surface of the LED package (for example, light is emitted in a upper side direction or a vertical direction) and a side view type LED package in which the emitting surface is the upper side surface of the LED package (for example, light is emitted in a side surface direction or a horizontal direction).

Further, the light source 220 may be implemented using a color LED emitting at least one of colors including red, blue, and green, or a white LED. Furthermore, the color LED may include at least one of a red LED, a blue LED, and a green LED, and the arrangement of the light emitting diodes and light emitted from the diodes may be modified within the scope of the embodiment.

On the other hand, the second layer 230 disposed on the first layer 210 to cover the light sources 220 transmits and diffuses light emitted from the light sources 220 such that the light emitted from the light sources 220 uniformly travels to the display panel 100.

The reflective layer 240 reflecting the light emitted from the light sources 220 may be disposed between the first layer 210 and the second layer 230, for example, on the first layer 210. The reflective layer 240 located on the first layer 21 reflects again the light total-reflected from the interface of the second layer 230 such that the light emitted from the light sources 220 can be diffused over a wider area.

The reflective layer 240 may be a synthetic resin sheet with white pigments, such as titanium dioxide, diffused therein, with a metal film deposited on the surface, or with bubbles therein to diffuse light, and silver (Ag) may be coated on the surface to increase reflectivity. Meanwhile, the reflective layer 240 may be formed by being coated on the upper surface of the first layer 210 that is a substrate.

The second layer 230 may be made of a light-transmitting material, for example, silicon-based or acryl-based resin. The second layer 230, however, is not limited to the materials described above, and may be made of various resins.

Further, the second layer may be made of a resin having about refractive index of 1.4 to 1.6 in order for the backlight unit 200 has uniform luminance while diffusing the light emitted from the light sources 220.

For example, the second layer 230 may be made of any one material selected from a group of polyethylene terephthalate polycarbonate, polypropylene, polyethylene, polystyrene, polyepoxy, silicon, and acryl.

The second layer may include a polymer resin having predetermined adhesive property to be firmly fixed to the light sources 220 and the reflective layer 240. For example, the second layer 230 may include acryl-based, urethane-based, epoxy-based, and melamine-based unsaturated polyester, methyl methacrylate, ethyl methacrylate, isobutyl methacrylate, n-butyl methacrylate, n-butyl methyl methacrylate, acryl acid, methacrylic acid, hydroxyethyl methacrylate, hydroxyl propyl methacrylate, hydroxylethyl acrylate, acrylamide, methylolacrylamide, glycidolmethacrylate, ethylacrylate, isobutyl acrylate, n-butyl acrylate, 2-ethylhexyl acrylate polymer, copolymer, or terpolymer.

The second layer 230 may be formed by applying and hardening liquid-state or gel-state resin above the first surface 210 with the light sources 220 and the reflective layer 240 thereon, or may be separately formed and then bonded onto the first layer 210.

Meanwhile, the larger the thickness (a) of the second layer 230, the wider the light emitted from the light sources 220 is diffused, such that light can be supplied to the display panel 100 in uniform luminance from the backlight unit 200. On the contrary, the larger the thickness (a) of the second layer 230, the more the amount of light absorbed in the second layer 230 increases, such that the entire luminance of the light supplied from the backlight unit 200 to the display panel 100 may be reduced.

Therefore, the thickness (a) of the second layer 230 may be about 0.1 to 4.5 mm in order to supply light having uniform luminance without largely reducing the luminance of the light supplied from the backlight unit 200 to the display panel 100.

The configuration of the backlight unit 100 according to an embodiment of the present invention is described hereafter in detail with an assumption that the first layer 210 of the backlight unit 200 is a substrate with the plurality of light sources 220 and the second layer 230 is a resin layer made of a predetermined resin.

Figure 18:
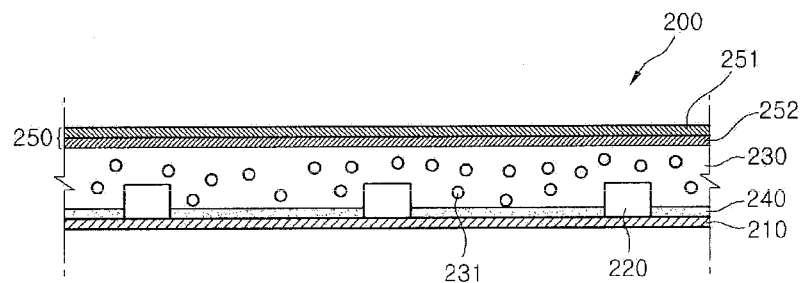

Referring to FIG. 18, a plurality of light sources 220 may be mounted on the substrate 210 and a resin layer 230 that covers all or some of light sources 220 may be disposed in the upper side of the substrate 210. Meanwhile, a reflective layer 240 may be formed between the substrate 210 and the resin layer 230, for example, on the upper surface of the substrate 210.

Further, as shown in FIG. 18, the resin layer 230 may include a plurality of scatter particles 231 and the scatter particles 231 can diffuse or refract incident light such that the light emitted from the light sources 220 is diffused wider.

The scatter particles 231 may be made of a material having refractive index different from the material of the resin layer 230, in detail, a material having refractive index higher than a silicon-based or acryl-based resin of the resin layer 230, in order to diffuse or refract the light emitted from the light sources 220.

For example, the scatter particles 231 may be made of polymethylmethacrylate/styrene copolymer (MS), polymethylmethacrylate (PMMA), polystyrene (PS), silicon, titanium dioxide ($TiO_2$) silicon dioxide ($SiO_2$) etc., or may be made of combination of those compounds.

Alternatively, the scatter particles 231 may be made of a material having refractive index smaller than the material of the resin layer 230, for example, may be made by creating bubbles in the resin layer 230.

However, the material for the scatter particles 231 is not limited to the materials described above and a variety of polymers or inorganic particles may be used.

According to an embodiment of the present invention, the resin layer 230 may be made by mixing the scatter particles 231 with liquid-state or gel-state resin, and then applying and hardening the mixture on the first layer 210 with the light sources 220 and the reflective layer 240 thereon.

Referring to FIG. 18, an optical sheet 250 may be disposed on the upper side of the resin layer 230, and for example, the optical sheet 250 may include one or more prism sheet 251 and/or one or more diffusion sheet 252.

In this case, the sheets included in the optical sheet 250 are bonded to or in close contact with each other, not spaced from each other, thereby reducing the thickness of the optical sheet 250 or the backlight unit 200.

Meanwhile, the lower surface of the optical sheet 250 may be in close contact with the resin layer 230 and the upper surface of the optical sheet 250 may be in close contact with the lower surface of the display panel 100, for example, to the lower polarizer 140.

The diffusion sheet 252 diffuses the incident light to prevent the light traveling out of the resin layer 230 from partially collecting, thereby keeping the luminance of the light uniform. Further, the prism sheet 251 can collect the light traveling out of the diffusion sheet 252 such that the light can travel perpendicularly into the display panel 100.

According to another embodiment of the present invention, in the optical sheet 250 described above, for example, at least one of the prism sheet 251 and the diffusion sheet 252 may be removed, or various function layers may be further included, other than the prism sheet 251 and the diffusion sheet 252.

Furthermore, a plurality of holes (not shown) may be formed at locations corresponding to the plurality of light sources 220, and the plurality of light sources 220 which are mounted on the lower substrate 210 may be inserted into the holes.

In this case, the light sources 220 are inserted into the lower side through the holes formed on the reflective layer 240 and, therefore, at least some thereof may protrude above the upper side of the reflective layer 240.

As described above, the backlight unit 200 is configured using the structure in which the light sources 220 are respectively inserted into the holes of the reflective layer 240, thereby additionally improving fixation between the substrate 210 in which the light sources 220 are mounted and the reflective layer 240

Meanwhile, a plurality of light sources 220 in the backlight unit 200 are arranged with the light emitting surfaces aligned at the sides, such that they can emit light to the sides, for example, in the direction in which a substrate 210 or a reflective layer 240 extends.

For example, the light sources 220 may be formed by a side view type LED package, and accordingly, it is possible to reduce the problem that the light sources 220 appear like hot spots on the picture and make the display apparatus as well as the backlight unit 200 slim by decreasing the thickness (a) of a resin layer 230.

Figure 19:
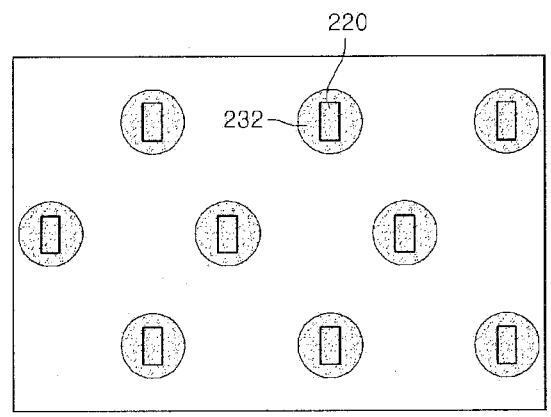

Referring to FIG. 19, a pattern layer including a plurality of patterns 232 may be formed on the upper side of the resin layer 230 of the backlight unit 200 including the light sources 220, more particular, the plurality of patterns 232 included in the pattern layer may be formed on the resin layer 230 so as to respectively correspond to the locations at which the light sources 220 are disposed.

For example, the patterns 232 formed on the upper side of the resin layer 230 may be reflective patterns that reflect at least some of light emitted from the light source 220.

As shown in FIG. 19, reflective patterns 232 are formed on the resin layer 230 to reduce the luminance of the light emitted from the region around the light source 220, such that light can be emitted in uniform luminance from the backlight unit 200.

That is, the reflective patterns 232 are formed on the resin layer 230 to correspond to the locations at which the plurality of light sources 220 is disposed to selectively reflect light emitted upwardly from the light sources 220 to reduce the luminance of the light emitted from the region around the light source 220, and the reflected light can be diffused in a side direction.

More specifically, light emitted in a upper side direction may be diffused in the side surface direction by the reflective patterns 232 and, at the same time, reflected in the lower side direction, and light reflected by the reflective patterns 232 may be again diffused in the side surface direction by the reflective layer 240 and, at the same time, reflected in the upper side direction. That is, the reflective patterns 232 may reflect 100 percent of the incident light or some of the incident light may be reflected or transmitted. As described above, the characteristic of the reflective patterns 232 may be regulated by controlling delivery of light through the resin layer 230 and the reflective patterns 232.

Accordingly, light emitted from the light sources 220 may be widely diffused in the side surface direction and other directions not upwardly concentrated and, therefore, light may be emitted from the backlight unit 200 in more uniform luminance.

The reflective patterns 232 include a reflective material, such as a metal or the like, and, for example, may be configured to include a metal having reflectivity of more than 90%, such as aluminum, gold or the like. For example, the reflective patterns 232 may be made of a material or in a shape to transmit light of less than 10% of the incident light and reflect the rest thereof.

In this case, the reflective patterns 232 can be formed by depositing or coating the metal as described above. Alternatively, the reflective patterns 232 can be formed by printing a reflective ink including a metal, for example, a silver ink in predetermined patterns.

Furthermore, in order to improve the reflection effect of the reflective patters 232, the color of the reflective patterns may have a color having high brightness, for example, a color close to white, in detail, a color having a brightness higher than that of the resin layer 230.

Meanwhile, the reflective patterns 232 may be configured to include metal oxide, for example, Titanium dioxide ($TiO_2$). More specifically, the reflective patterns 232 may be formed by printing a reflection ink including Titanium dioxide ($TiO_2$) in predetermined patterns.

Meanwhile, the configuration in which the plurality of reflective patterns 232 is formed to correspond to the locations of the light resources 220 may include not only a configuration in which the reflective pattern 232 is formed to be concentric with the center of the light source 220 corresponding thereto as shown in FIG. 19 but also a configuration in which the reflective pattern 232 is formed such that its center is spaced by a certain interval from the center of the light source 220 corresponding thereto.

Figure 20:
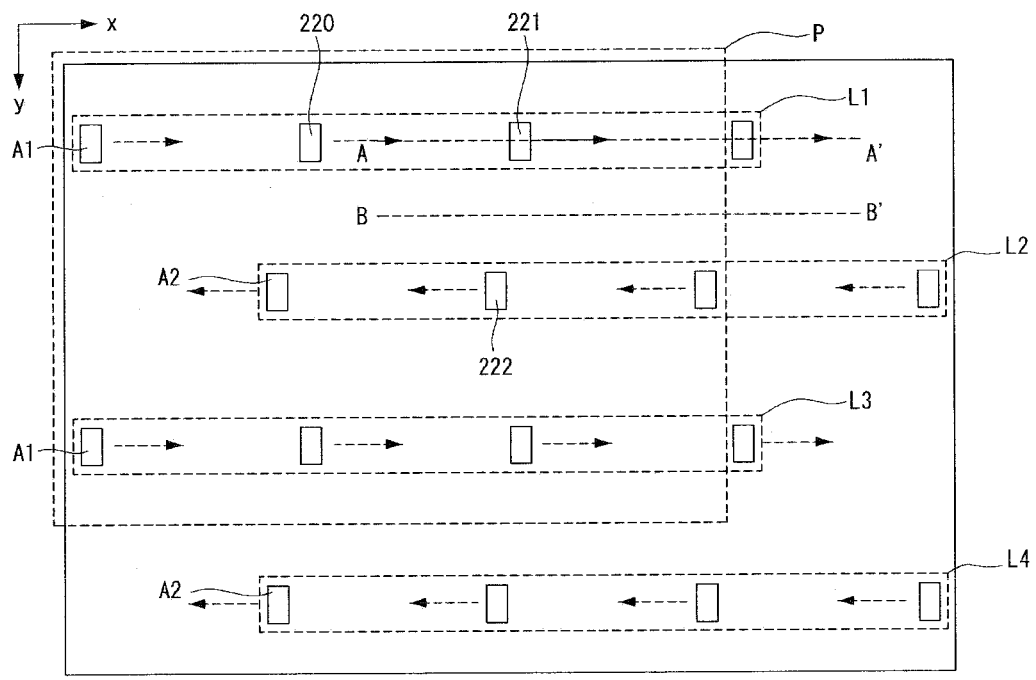

Referring to FIG. 20, the plurality of light sources 220 and 221 included in the backlight unit 200 may be divided into a plurality of arrays, for example, a first light source array A1 and a second light source array A2 and be then disposed.

Meanwhile, the first light source array A1 and the second light source array A2 may include a plurality of light source lines, each of which is composed of light sources. Foe example, the first light source array A1 is configured of a plurality of lines L1, each including two or more light sources, and the second light source array A2 is configured of a plurality of lines L2, each including two or more light sources.

The light source lines included in the first light source array A1 and the source lines included in the second light source array A2 may be arranged to be alternated with each other so as to correspond to the display area of the display panel 100.

According to another embodiment of the present invention, the first light source array A1 may be configured to include odd-numbered light source lines from the upper side thereof among the plurality of light source lines including light sources, and the second light source array A2 may be configured to include even-numbered light source lines from the upper side thereof.

A first light source line L1 included in the first light source array A1 and a second light source line L2 included in the second light source array A2 are disposed to be vertically adjacent to each other, and the first light source line L1 and the second light source line L2 are disposed to be alternated with each other, thereby configuring the backlight unit 200.

Furthermore, the light sources 220 included in the first light source array A1 and the light sources 222 included in the second light source array A2 may emit light in the same direction or in different directions.

Referring to FIG. 20, the backlight unit 200 may include two or more light sources which emit light in different directions.

That is, the light sources 220 included in the first light source array A1 and the light sources 222 included in the second light source array A2 may emit light in different directions and, for this, a direction in which the light-emitting surfaces of the light sources 220 included in the first light source array A1 and a direction in which the light-emitting surfaces of the light sources 222 included in the second light source array A2 is directed is directed may be different from each other.

More specifically, the light-emitting surfaces of a first light source 220 and a second light source 221 included in the first light source array A1 and the light-emitting surface of a third light source 222 included in the second light source array A2 may be formed to be directed in opposite directions. Accordingly, the first light source 220 and the second light source 221 included in the first light source array A1 and the third light source 222 included in the second light source array A2 may be emit in directions opposite to each other.

In this configuration, the light sources in the backlight unit 200 can emit light respectively in side directions and a side view type LED package can be used to implement the configuration.

Meanwhile, the light sources of the backlight unit 200 may be arranged in two or more rows and the two or more light sources in the same row can emit light in the same direction.

For example, the second light source 221 adjacent to the first light source 220 can also emit light in the same direction as the first light source 220, that is, in a x-axis direction, and the light sources adjacent to the third light source 222 can emit light in the same direction as the third light source 222, that is, in a direction opposite to the x-axis direction.

It is possible to prevent the luminance of the light from being concentrated or being weakened in a specific region of the backlight unit 200 the light sources disposed in the y-axis direction, by making the light-emitting directions of the light sources disposed in the y-axis direction, that is, the second light source 221 and the third light source 222 opposite to each other.

That is, the light emitted from the second light source 221 can be weakened while traveling to an adjacent light source. Accordingly, as illuminated areas are located further and further away from the second light source 221, the more the luminance of the light emitted from the corresponding area to the display panel may be weakened.

Therefore, it is possible to compensate the concentration of luminance of the light in the region adjacent to the light source with the weakening of luminance of the light in the region far from the light source by arranging the second light source 221 and the third light source 222 such that the light-emitting directions are opposite to each other, and it is correspondingly possible to make the luminance of the light emitted from the backlight unit 200 uniform.

Furthermore, the light sources of the first light source line L1 included in the first light source array A1 and the light sources of the second light source line L2 included in the second light source array A2 may be disposed in a misaligned arrangement not to be vertically aligned with each other, thereby allowing light emitted from the backlight unit 200 to be emitted more uniformly.

That is, the third light source 222 included in the second light source array A2 may be disposed to be adjacent to the first light source 220 and the second source 221 included in the first light source array A1 in a diagonal direction.

FIGS. 21 to 28 are diagrams enlarging portion "P" of FIG. 20.

Figure 21:
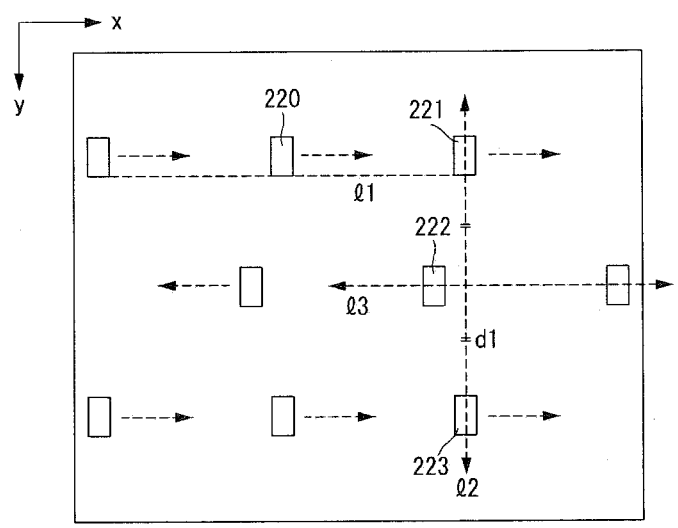
Figure 22:
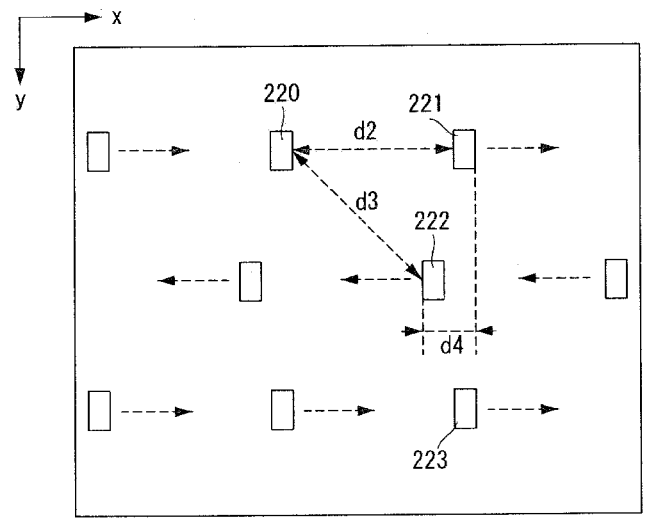

Referring to FIGS. 21 and 22, two light source lines formed to be vertically adjacent to each other respectively included in the first light source array A1 and the second light source array A2, for example, the first light source line L1 and the second light source line L2 may be spaced from each other by a predetermined interval.

The first light source 220 that emit light in one direction may be disposed in the first light source array A1. Furthermore, the second light source 221 that is arranged to be adjacent to the first light source 220 on the same horizontal line l1 as the first light source 220 and emits light in the same direction as the first light source 220 may be disposed. In this case, the horizontal line l1 may be a line extended in the x-axis direction.

The third light source 222 that emits light in a direction opposite to that of the first light source 220 may be disposed in the second light source array A2. The third light source 222 may be disposed between the first light source 220 and the second light source 221 and may be disposed in a diagonal direction with respect to the first light source 220 and the second light source 221.

Furthermore, a third light source line L3 formed in the first light source array A1 may be spaced from the second light source line L2 by a predetermined interval. A fourth light source 223 that emits light in the same direction as the second light source 221 may be disposed on a line l2 that is perpendicular to the direction in which the second light source 221 emits light and the second light source 221.

Furthermore, the third light source 222 may be disposed between the second light source 221 and the fourth light source 223 and may be disposed on a horizontal line -C 3 at which the distance d1 between the second light source 221 and the fourth light source 223 is divided into two equal parts.

Furthermore, the third light source 222 may be disposed to be adjacent to the line l2 perpendicular to the second source light 221 and may be disposed in a direction opposite to the direction in which the second light source 221 emits light.

In this case, the light-directional angle θ from the light source and the light-directional angle θ' in the second layer 230 may have the following Formula 1 in accordance with Snell's law.

$$\frac{n1}{n2} = \frac{\sin\theta'}{\sin\theta} \quad \text{[Formual 1]}$$

On the other hand, considering that the portion where light is emitted from the light source is an air layer (1 of refractive index) and the light-directional angle θ from the light source is generally 60 degrees, the light-directional angle in the second layer 230 may have the value expressed by the following Formula 2, in accordance with Formula 1.

$$\sin\theta' = \frac{\sin 60°}{n2} \quad \text{[Formula 2]}$$

Furthermore, when the second layer 230 is made of acryl-based resin, such as PMMA (polymethyl methacrylate), it has refractive index of about 1.5, so that the light-directional angle θ' within the second layer 230 may be of about 35.5 degrees in accordance with Equation 2.

As described by referring to Equations 1 and 2, the directional angle θ' of the light emitted from the light source in the second layer 230 can be less than 45 degrees. Accordingly, a range in which the light emitted from the light source travels in the y-axis direction may be smaller than a range in which the light travels in the x-axis direction.

Accordingly, the third light source 222 may be disposed on the horizontal line l3 at which the distance d1 between the second light source 221 and the fourth light source 223 is divided into two equal parts, thereby making the luminance of the light emitted from the backlight unit 200 uniform.

Meanwhile, referring to FIG. 22, the first light source 220, the second light source 221 and the third light source 222 may be located to be spaced from each other at a predetermined distance.

More specifically, the first light source 220 and the second light source 221 may be spaced from each other by a first distance d2 that is a distance between the light-emitting surface of the first light source 220 and the surface opposite to the light-emitting surface of the second light source 221. Furthermore, the first light source 220 and the third light source 222 may be spaced from each other by a second distance d2 that is a distance between the center of the light-emitting surface of the first light source 220 and the center of the light-emitting surface of the third light source 222. Furthermore, a third distance d4 that is a horizontal distance between the light emitting surface of the second light source 221 and the light emitting surface of the third light source 222 may be possible.

In this case, the first distance d2 that is the distance between the center of the light-emitting surface of the first light source 220 and the center of the surface opposite to the light-emitting surface of the second light source 221 is less than or identical to the second distance d2 that is a distance between the center of the light-emitting surface of the first light source 220 and the center of the light-emitting surface of the third light source 222.

When the first distance d2 that is the distance between the center of the light-emitting surface of the first light source 220 and the center of the surface opposite to the light-emitting surface of the second light source 221 is less than the second distance d2 that is a distance between the center of the light-emitting surface of the first light source 220 and the center of the light-emitting surface of the third light source 222, a region in which the light emitted from the first light source 220 and the light emitted from the third light source 222 overlap each other is decreased, thereby preventing the luminance thereof from being ununiform. Furthermore, the third distance d4 that is the horizontal distance between the light emitting surface of the second light source 221 and the light emitting surface of the third light source 222 is decreased, thereby preventing the luminance thereof from being lowered in the region between the second light source 221 and the third light source 222.

Figure 23:
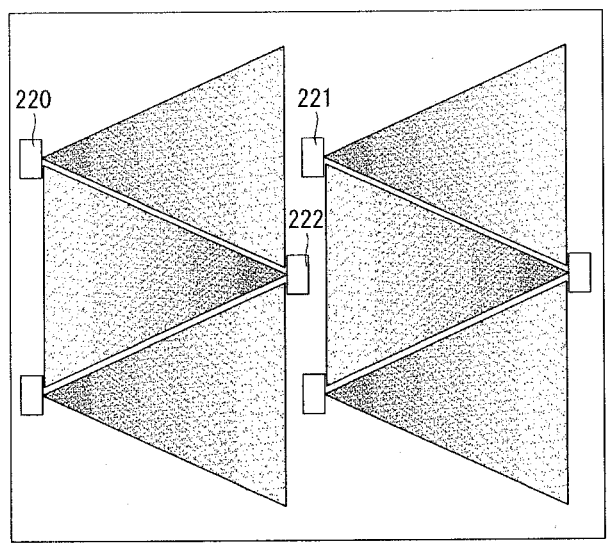

In order words, as shown in FIG. 23, the region in which the light emitted from the first light source 220 and the light emitted from the third light source 222 overlap each other is removed, thereby preventing the luminance thereof from being ununiform.

Furthermore, When the first distance d2 that is the distance between the center of the light-emitting surface of the first light source 220 and the center of the surface opposite to the light-emitting surface of the second light source 221 is identical to the second distance d2 that is a distance between the center of the light-emitting surface of the first light source 220 and the center of the light-emitting surface of the third light source 222, a region in which the light emitted from the first light source 220 and the light emitted from the third light source 222 overlap each other can be minimized and the third distance d4 that is the horizontal distance between the light emitting surface of the second light source 221 and the light emitting surface of the third light source 222 can be maximized. That is, there are advantages in that light overlap between the first light source 220 and the third light source 222 can be minimized and the occurrence of dark regions between the second light source 221 and the third light source 222 can be minimized.

Figure 24:
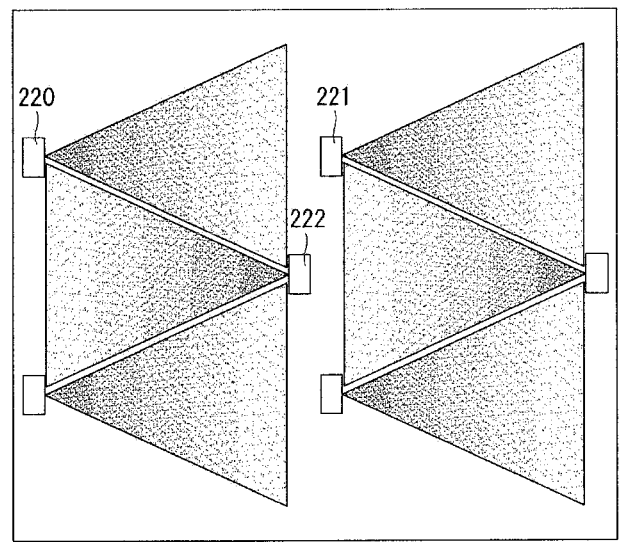

In order words, as shown in FIG. 24, there are advantages in that the region in which the light emitted from the first light source 220 and the light emitted from the third light source 222 overlap can be minimized and the lowering of the luminance can be minimized in the region between the second light source 221 and the third light source 222.

Accordingly, the backlight unit according an embodiment of the present invention has an advantage of providing uniform luminance throughout the front surface of the backlight unit.

Figure 25:
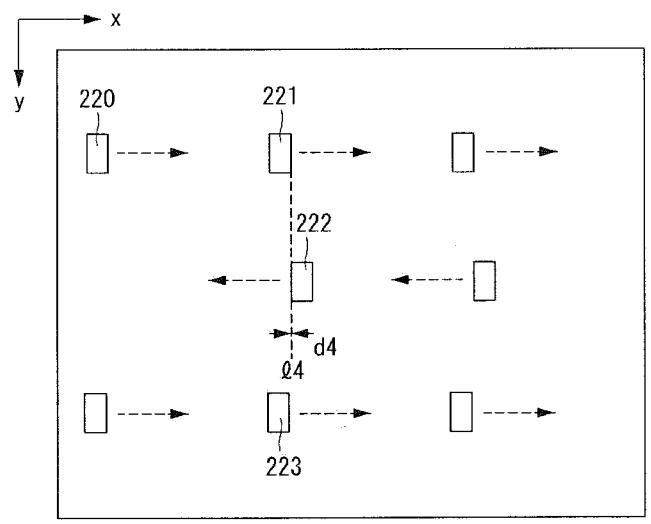
Figure 26:
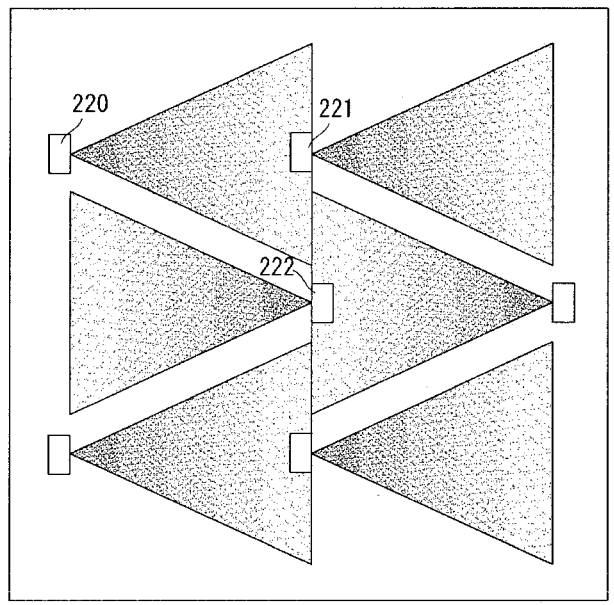

Furthermore, referring to FIGS. 25 and 26, the second light source 221 and the third light source 222 may be disposed such that the light-emitting surface of the second light source 221 and the light-emitting surface of the third source 222 are located on the same vertical line l4. That is, the third distance d4 that is the distance between the light emitting surface of the second light source 221 and the light emitting surface of the third light source 222 may be the shortest distance.

Accordingly, as shown in FIG. 26, the occurrence of dark regions is prevented between the light-emitting surface of the second light source 221 and the light-emitting surface of the third light source, thereby providing the backlight unit 200 representing more excellent luminance uniformity.

Meanwhile, in the backlight unit of the present invention, the first layer 210, in which the light sources 220 are disposed, may be divided into a plurality of layers and disposed.

Figure 28:
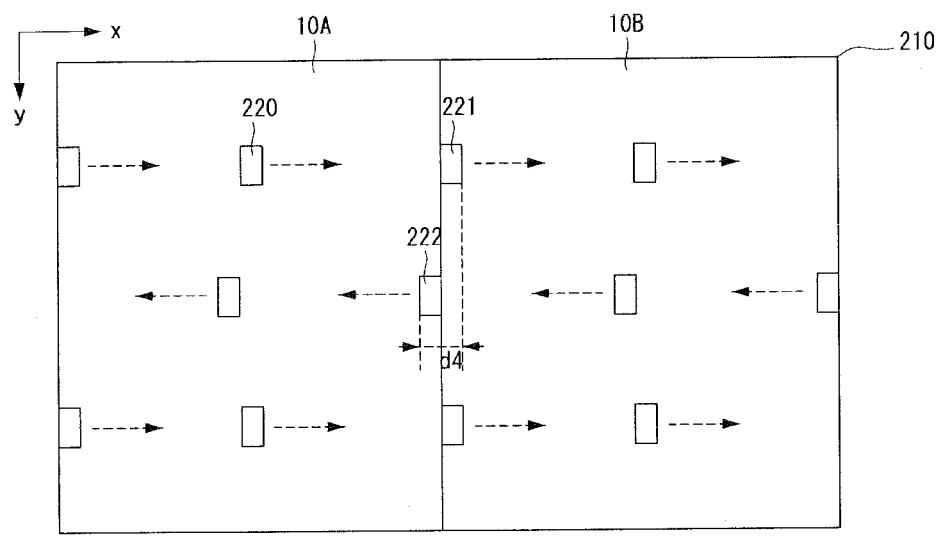

FIGS. 28 and 28 are diagrams showing a backlight unit including two or more first layers 210.

Figure 27:
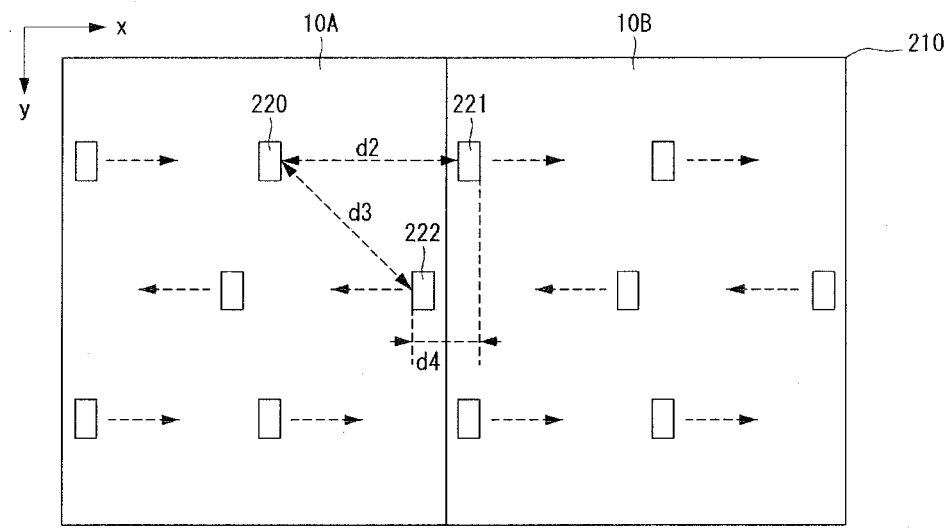

Referring to FIG. 27, a first optical assembly 10A and a second optical assembly 10B in which a plurality of light sources 220, 221 and 222 are respectively disposed on a first layer 210 are disposed to be adjacent to each other. The plurality of light sources which are respectively disposed in the first optical assembly 10A and the second optical assembly 10B may be disposed in the same arrangement as each other.

More specifically, the first light source 220 that emits light in one direction and the third light source that emits light in a direction opposite to the direction in which the first light source 220 emits light may be disposed in the first optical assembly 10A.

Furthermore, the second light source 221 that is arranged on the same horizontal direction as the first light source 220 and emits light in the same direction as in the first light source 220 may be disposed in the second optical assembly 10B.

As described with reference to FIG. 22 above, the first distance d2 that is the distance between the center of the light-emitting surface of the first light source 220 and the center of the surface opposite to the light-emitting surface of the second light source 221 is less than or identical to the second distance d2 that is a distance between the center of the light-emitting surface of the first light source 220 and the center of the light-emitting surface of the third light source 222.

Furthermore, referring to FIG. 27, the third light source 222 disposed in the first optical assembly 10A may be disposed to be adjacent to the side of the first optical assembly 10A and the second light source 221 disposed in the second optical assembly 10B may be disposed to be adjacent to the side of the second optical assembly 10B In this case, the third distance d4 that is the horizontal distance between the light emitting surface of the second light source 221 and the light emitting surface of the third light source 222 may be identical to the sum of widths of the second light source 221 and the third light sources 222.

In particular, the second light source 221 and the third light sources 222 may respectively have a width of about 1 to 2 mm. Accordingly, in this embodiment, in the case of the backlight unit including the plurality of optical assemblies, the third distance d4 that is the distance between the light emitting surface of the second light source 221 and the light emitting surface of the third light source 222 may be identical to the sum of widths of the second light source 221 and the third light sources 222.

Figure 29:
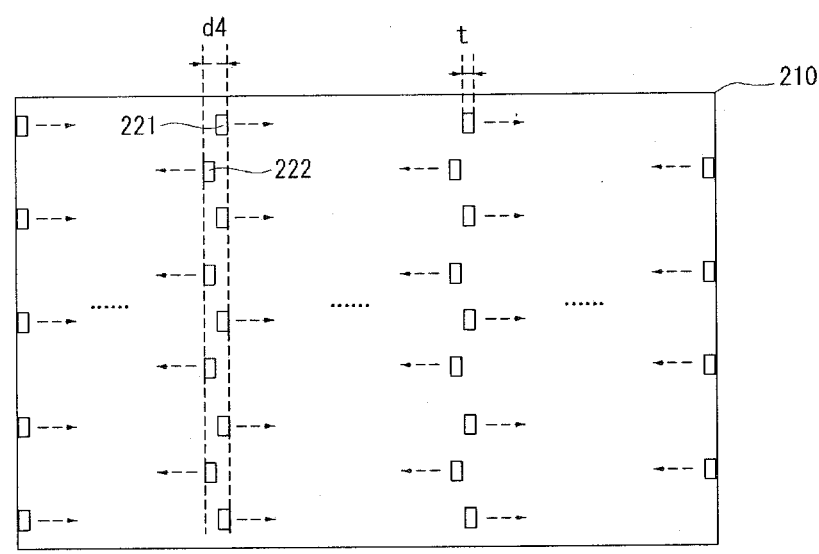
Figure 30:
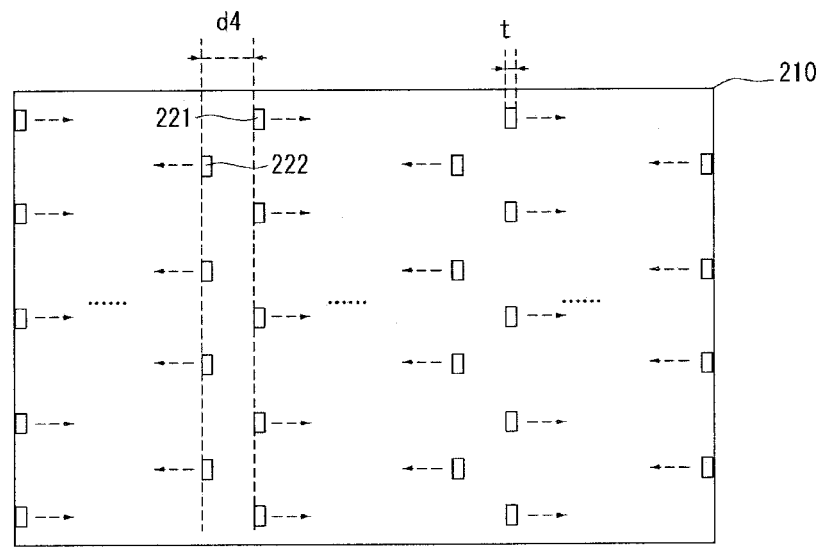

In this case, referring to FIGS. 29 and 30, the third distance d4 that is the distance between the light emitting surface of the second light source 221 and the light emitting surface of the third light source 222 may be greater than or identical to the sum 2t of widths t of the second light source 221 and the third light sources 222, or may be less than or identical to 10 times 10t the width t of the light sources 221 and 222. That is, d4 may be 2t to 10t, more preferably, d4 may be 3t to 8t.

Furthermore, the third distance d4 that is the horizontal distance between the light emitting surface of the second light source 221 and the light emitting surface of the third light source 222 is decreased, thereby preventing the luminance thereof from being lowered in the region between the second light source 221 and the third light source 222.

Accordingly, the backlight unit according to this embodiment prevents the luminance from being ununiform between the first light source 220 and the third light source 222 or the second light source 221 and the third light source 222 as described above, thereby providing the backlight unit 200 representing more excellent luminance uniformity.

Figure 31:
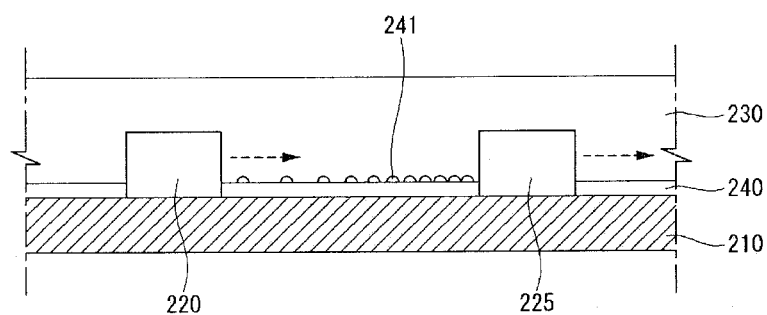
Figure 32:
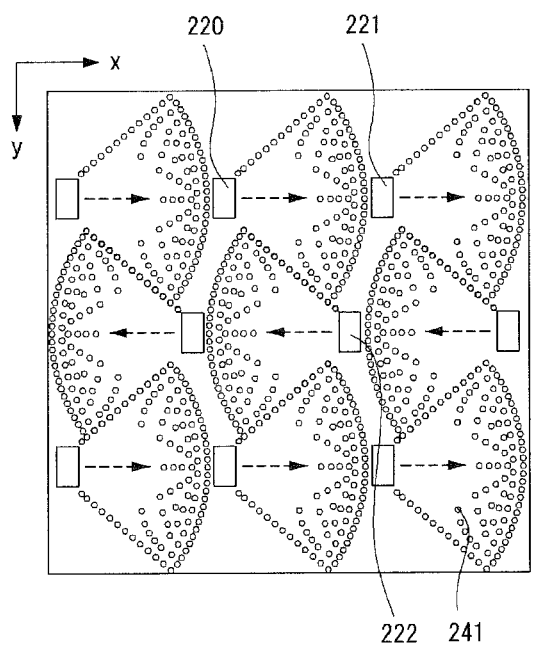

FIGS. 31 and 32 are diagrams showing a backlight unit according to an embodiment of the present invention.

Referring to FIG. 32, the backlight unit according the embodiment of the present invention may include a plurality of diffusion patterns 241 formed therein that allows light emitted from a light source 200 on a reflective layer 240 to easily travel to an adjacent light source 225. The plurality of diffusion patterns 241 can diffuse or refract the light emitted from the light source 220.

More specifically, referring to FIG. 32, the backlight unit 200 may include two or more light sources which emit light in different directions.

The backlight unit 200 may include a first light source 220 and a second light source 221 which emits light toward the side thereof in a direction parallel to x-axis, that is, in the same direction. Furthermore, the first right source 220 is arranged to be perpendicular to the arranged x-axis and a third light source 222 that emits light in a direction opposite to that as in the first light source 220 may be disposed. That is, rows in which the first light source 220 and the second light source 221 are arranged and rows in which the third light source 222 is arranged may be disposed to be alternated with each other.

Accordingly, it is possible to prevent the luminance of the light from being concentrated or being weakened in a specific region of the backlight unit 200 the light sources disposed in the y-axis direction, by making the light-emitting directions of the first source 220 and the second light source 221 and light-emitting direction of the third light source 222 opposite to each other.

In this case, as the light emitted from the respective light sources 220, 221 and 222 travels, the luminance may be weakened. Accordingly, as illuminated areas are located further and further away from the respective light sources 220, 221 and 222, the luminance of the light emitted from the corresponding area to the display panel may be more weakened.

Therefore, in the eighth embodiment of the present invention, the plurality of diffusion patterns 241 may be disposed between the respective light sources 220, 221 and 222. The plurality of diffusion patterns 241 diffuse or refract light emitted from the light sources 220, 221 and 222 to allow the light having uniform luminance to be emitted from the backlight unit 200.

The plurality of diffusion patterns 241 may include at least one of a metal or a metal oxide which is a reflective material, and, for example, may be configured to include a metal or a metal oxide having high reflectivity, such as aluminum (Al), silver (Ag), gold (Au) or Titanium dioxide ($TiO_2$).

In this case, the plurality of diffusion patterns 241 may be formed by deposing and coating the metal or the metal oxide on the first layer 210 or by printing a metal ink. In this case, as a deposition method, a vacuum deposition method such as a thermal deposition method, an evaporation method or a sputtering method may be used and, as a coating or printing method, a printing method, a Gravure coating method or a silk screen method may be used.

Furthermore, in order to improve the diffusion or refraction effects of the plurality of diffusion patterns 241, the color of the plurality of diffusion patterns 241 may be a color having high brightness, for example, a color close to white.

Furthermore, the plurality of diffusion patterns 241 may be composed of a plurality of dots respectively including the above-described material. For example, the plurality of diffusion patterns 241 may be composed of dots, whose cross section is circle, oval or polygon shape.

The density of the plurality of diffusion patterns 241 may increases from one light source to another light source adjacent thereto. For example, the density may increases from the first light source 220 to the second light source 221. Accordingly, it is possible to prevent the luminance of light emitted upward from a region far from the first light source 220, that is, the rear region of the second light source 221, from being reduced, so that the luminance of the light supplied from the backlight unit 200 can be kept uniform.

For example, in the plurality of diffusion patterns 241 that is composed of dots, the interval between two neighboring diffusion patterns may increases from the light-emitting surface of the first light source 220 to the second light source 221, and, accordingly, the light emitted from the first light source 220 is more diffused or refracted as the light travels toward the second light source 221, thereby the luminance thereof being kept uniform.

In particular, the plurality of diffusion patterns 241 may barely exist in the region adjacent to the respective light sources 220, 221 and 222. Accordingly, in the region where the plurality of diffusion patterns 241 does not exist, the light emitted from the light sources 220, 221 and 222 is total-reflected by the reflective layer 240 disposed under it and travels, and in the region where the plurality of diffusion patterns 241 exists, the light is diffused or refracted so that the luminance can be kept uniform in the whole region including the region adjacent to the light sources 220, 221 and 222.

The plurality of diffusion patterns 241 may be disposed in a line along the diagonal line between the first light source 220 and the third light source 222. Therefore, the direction of the light emitted from the first light source 220 and the direction of the light emitted from the third light source 222 are opposite to each other, the luminance may increase in the region where the light of the first light source 220 and the light of the third light source 222 overlap each other. Accordingly, the plurality of diffusion patterns 241 is disposed along the diagonal line between the first light source 220 and the third light source 222, thereby preventing the luminance from increasing in the in the overlap region of the light.

As a result, as shown in FIG. 32, a plane shape formed by the plurality of diffusion patterns 241 arranged in the direction in which the first light source 220 emits light may be symmetrical to a plane shape formed by the plurality of diffusion patterns 241 arranged in the direction in which the third light source 222 emits light.

For example, the plane shapes formed by the plurality of diffusion patterns 241 arranged in the directions in which the first source 220 and third light source 222 respectively emit light may be a fan shape.

The fan shape is formed such that the directional angle of the light emitted from the light source is about 120 degrees and, accordingly, light emitted form the light source is efficiently delivered and diffused, thereby the luminance of the backlight unit being kept uniform.

Figure 33:
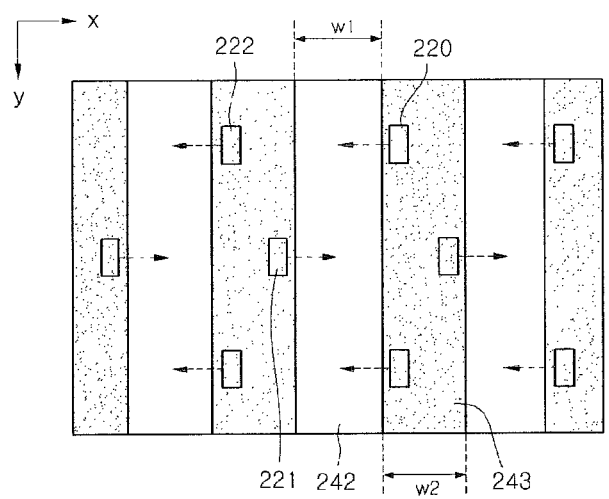

Referring to FIG. 33, the reflective layer 240 included in the backlight unit 200 may have two or more reflectivities. For example, the reflective layer 240 may be configured such that the reflectivity thereof may vary according to the formation locations thereof. That is, the reflective layer 240 may include two or more regions having different reflectivities.

Referring to FIG. 33, the reflective layer 240 may include a first reflective layer 242 and a second reflective layer 243 which may have different reflectivities, and the first reflective layer 242 and the second reflective layer 243 may be disposed to be alternated with each other.

For example, the reflectivities of the first and second reflective layers 242 and 243 may be implemented to be different from each other by configuring the first and second reflective layers 242 and 243 using reflection sheets made of different materials or adding a specific material into or performing surface-surface-treatment on any one of the first and second reflective layers 242 and 243 made of reflection sheets made of the same material.

According to the embodiment of the present invention, the first and second reflective layers 242 and 243 may be made of one reflection sheet which can not be physically separated into parts. In this case, the first and second reflective layers 242 and 243 having different reflectivities as described above may be formed by forming patterns for adjusting the reflectivity on at least a part of the reflection sheet.

That is, the reflectivity can by adjusted by forming the patterns on at least one region of a region corresponding to the first reflective layer 242 and a region corresponding to the second reflective layer 243. For example, the patterns may be formed on the region corresponding to the second reflective layer 243 shown in FIG. 33 of the reflective layer 240 made of one reflection sheet, thereby adjusting the reflectivity of the corresponding region.

More specifically, protrusion patterns that diffuse light to the upper side surface of the region corresponding to the second reflective layer 243 of the reflective layer 240 may be formed, thereby decreasing the reflectivity of the region corresponding to the second reflective layer 243. In this case, light diffusion effect can be improved in the region corresponding to the second reflective layer 243 of the reflective layer 240 and, accordingly, the light emitted from the light source 220 can be uniformly diffused up to the region in which an adjacent light source 222 is disposed.

Furthermore, the first and second reflective layers 242 and 243 may have different surface roughness. For example, the surface roughness of the second reflective layer 243 is set to be higher than the surface roughness of the first reflective layer 242, so that the reflectivity of the second reflective layer 243 may be lower than the reflectivity of the first reflective layer 242.

Meanwhile, the first reflective layer 242 adjacent to the light sources 220, 221 and 222 with respect to the direction in which light is emitted among the first and second reflective layers 242 and 243 may be configured of a specular reflection sheet and the second reflective layer 243 may be configured of a diffuse reflection sheet.

In the specular reflection sheet, light incident on the smooth surface thereof is reflected and the incident angle and reflection angle may be identical to each other. Accordingly, the first reflective layer 242 reflects light slantingly incident from the light sources 220, 221 and 222 at a reflection angle identical to the incident angle, thereby allowing the light to travel in a direction facing the adjacent light source.

Meanwhile, it may be observed like that the incident light is reflected and diffused at multiple angles due to scattered reflection occurring in a rough surface which is concavo-concave are formed in the diffuse reflection sheet, and accordingly, the second reflective layer 243 diffuses light which is emitted from the light sources 220, 221 and 222 and travels to allow the light to be emitted in a upper direction.

According to an embodiment of the present invention, the reflective layer 243 made of a diffusion reflective sheet may be formed by treating the surface of the reflection sheet to form concavo-concave patterns or coating or adding a diffuse reflection material, for example, titanium dioxide ($TiO_2$) thereon at a predetermined density.

In this case, the reflectivity of the first reflective layer 242 may be higher than the reflectivity of the second reflective layer 243, so that, as described above, in the first reflective layer 242, light incident from the light sources 220, 221 and 222 is specular reflected at the same reflection angle and, in the second reflective layer 243, diffuse reflection occurs to allow the light to be emitted upward.

As described above, by configuring the first reflective layer 242 adjacent to the light sources 220, 221 and 222 with respect to the direction in which light is emitted using a specular-reflection sheet having high reflectivity, the light emitted from the light sources 220, 221 and 222 may efficiently travel to an adjacent light source, thereby reducing the phenomenon in which the luminance of light is concentrated on the region adjacent to the light sources 220, 221 and 222 and the luminance of light is weakened in the region far from the light sources 220, 221 and 222.

Furthermore, by configuring the second reflective layer 243 far from the light sources 220, 221 and 222 with respect to the direction in which light is emitted using a diffuse reflection sheet having relatively low reflectivity, the light emitted from the light sources 220, 221 and 222 can be efficiently emitted toward the display panel 100 thereby compensating for the luminance which is weakened when the light emitted from the light sources 220, 221 and 222 travels to the adjacent light sources and therefore, reducing phenomenon in which the luminance of light is weakened in the region far from the light sources 220, 221 and 222.

Meanwhile, the specular reflection sheet constructing the first reflective layer 242 specular-reflects light emitted from the light sources 220, 221 and 222 to allow the light to travel to an adjacent light source and, at the same time, reflects or scatters some of the incident light in the upper direction to allow the light to be emitted in the direction of the display panel 100.

The diffuse reflection sheet constructing the second reflective layer 243 may be manufactured by treating the surface of the sheet made of the same material as the specular reflection sheet or forming a plurality of protrusion patterns on the surface thereof.

According to the embodiments of the present invention, the light luminance of the region adjacent to the light sources 220, 221 and 222 and the light luminance of region far from the light sources 220, 221 and 222 can be adjusted to be similar to each other, thereby providing uniform light luminance to the display panel 100 on the whole region of the backlight unit 200.

In order to allow the light emitted from the light sources 220, 221 and 222 to travel up to the region in which the adjacent light source is disposed, the width w1 of the first reflective layer 242 adjacent to the light sources 220, 221 and 222 with respect to the direction in which the light is emitted may be set to be higher than the width w2 of the second reflective layer 243. However, the width w1 of the first reflective layer 242 may be identical to or less than the width w2 of the second reflective layer 243. In this case, the reflectivities of the first reflective layer 242 and the second reflective layer 243 may be adjusted so as to achieve the above-described effect.

Meanwhile, as the width w1 of the first reflective layer 242 decreases, the traveling property of the light emitted from the light sources 220, 221 and 222 may be reduced, and, accordingly, the light luminance may be weakened in the region far from the light sources 220, 221 and 222.

Furthermore, when the width w1 of the first reflective layer 242 increases largely compared to the width w2 of the second reflective layer 243, light may be concentrated on the region far from the light sources 220, 221 and 222, and for example, a light luminance in the middle region between the neighboring two light sources 220 and 222 may be weakened compared to that in the region far from the light sources 220, 221 and 222.

In order to allow the light emitted from the light sources 220, 221 and 222 to efficiently travel to the region in which the adjacent light source is disposed and to be emitted upward so as to provide the providing light of uniform luminance to the display panel 100 on the whole region of the backlight unit 200, the width w1 of the first reflective layer 242 may be set to 1.1 to 1.6 times the width w2 of the second reflective layer 243.

Referring to FIG. 33, the first light source 220 and the second light source 221 arranged to be adjacent to each other in y-axis may be disposed in a location in which they are not superposed onto the first reflective layer 242, that is, out of the region in which the first reflective layer 242 is formed.

Furthermore, the third light source 222 and the second light source 221 adjacent to the first light source 220 in x-axis may be disposed in the inside of the region in which the second reflective layer 243 is formed.

For example, holes (not shown) into which the second light source 221 and the third light source 222 can be inserted may be formed in the second reflective layer 243, and accordingly, the second and third light sources 221 and 222 embedded in the substrate 210 disposed under the second reflective layer 243 can protrude outwardly through the holes of the second reflective layer 243 and emit light in a side direction.

Meanwhile, the locations at which the light sources 220, 221 and 222 shown in FIG. 33 are merely embodiments of the present invention, so that the location relationship between the light sources 220, 221 and 222 and the first and second reflective layers 242 and 243 may vary.

Figure 34:
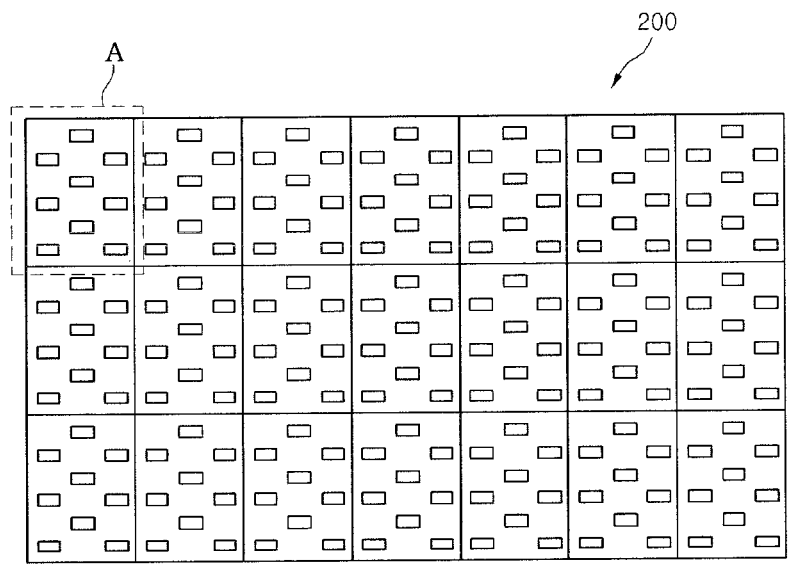

FIG. 34 is a cross-sectional view showing the configuration of a backlight unit according to an embodiment of the present invention.

Referring to FIG. 34, a first layer 210, a plurality of light sources 220 formed on the first layer, a second layer 230 to cover the plurality of light sources 220, and a reflective layer 240, as described with reference to FIGS. 17 to 33, may constitute one optical assembly A, and a backlight unit 200 may be configured by disposing a plurality of optical assemblies A to be adjacent to each other.

Meanwhile, N and M optical assemblies included in the backlight unit 200 may be disposed in a matrix in the x-axis and y-axis directions, respectively, where N and M are integers of 1 or more.

As shown in FIG. 34, twenty one optical assemblies A may be arranged in a 7×3 matrix in the backlight unit 200. The configuration shown in FIG. 34, however, is an example for explaining the backlight unit according to the present invention, so that the present invention is not limited thereto and may be modified in accordance with the screen size etc. of the display apparatus.

For example, in the case of a 47 inch display apparatus, the backlight unit 200 can be implemented by arranging 240 optical assemblies in a 24×10 matrix.

Each of the optical assemblies A may be manufactured as an individual assembly and a module type backlight unit may be formed by disposing them to be adjacent to each other. The module type backlight unit can provide light to the display panel 100 as the backlight unit.

As described above, the backlight unit 200 can be driven by a full driving scheme or a partial driving scheme such as local dimming, impulsive, etc. The driving scheme of the backlight unit 200 may be variously modified depending on circuit designs and is not limited thereto. As a result, in the embodiment, a color contrast ratio is increased and images for a bright part and a dark part on a screen can be clearly expressed, such that an image quality is improved.

That is, the backlight unit 100 is divided into a plurality of blocks to be driven for each of the divided blocks, and decreases the luminance of a black part of an image and increases the luminance of a bright part by linking the luminance of each of the divided blocks with the luminance of an image signal so as to improve a contrast ratio and definition.

For example, it is possible to emit light upward by individually driving only some of the optical assemblies A shown in FIG. 34, and for this, the lights sources 220 included in the optical assemblies A can be individually controlled.

On the other hand, the region corresponding to one optical assembly A in the display panel 10 may be divided into two or more blocks, and the display panel 100 and the backlight unit 200 may be divided and driven in the block unit.

According to the embodiment of the present invention, the backlight unit 200 may be divided into a plurality of blocks and be driven for the divided block, and decreases the luminance of a black part of an image and increases the luminance of a bright part by linking the luminance of each of the divided blocks with the luminance of an image signal so as to improve a contrast ratio and definition.

For example, in the case in which the backlight unit 200 is driven in the local dimming scheme, the display panel 100 may have a plurality of division regions to correspond to the blocks of the backlight unit 200 respectively. The brightness of the light emitted from each of the blocks of the backlight unit 200 may be controlled depending on a luminance level of each of the division regions of the display panel 100, for example, a peak value of a gray level or a color coordinate signal.

That is, the plurality of light sources included in the backlight unit 200 may be divided into a plurality of blocks and driven respectively for the divided blocks.

The block is a basic unit to which driving power that allows the backlight unit 200, more specifically, the plurality of light sources included in the backlight unit 200 to emit light is supplied. That is, the light sources included in one block are simultaneously turned on or turned off, and when being turned on, can emit light of same luminance. Furthermore, the light sources included in different blocks of the backlight unit 200 are supplied with different driving power, thereby emitting light having different luminance.

It is possible to simplify the manufacturing process of the backlight unit 200, minimize loss that may be generated in the manufacturing process, and improve productivity, by combining the plurality of optical assemblies A to construct the backlight unit 200. The backlight unit 100 is advantageous in that the optical assembly 10 is standardized and mass-produced to be applied to backlight units having various sizes.

Meanwhile, in the case in which any one of the optical assemblies 10 of the backlight unit 100 has a failure, only the optical assembly having the failure has to be replaced without replacing the entire backlight unit 100, and, therefore, a replacing work is easy and a part replacement cost is saved.

Figure 35:
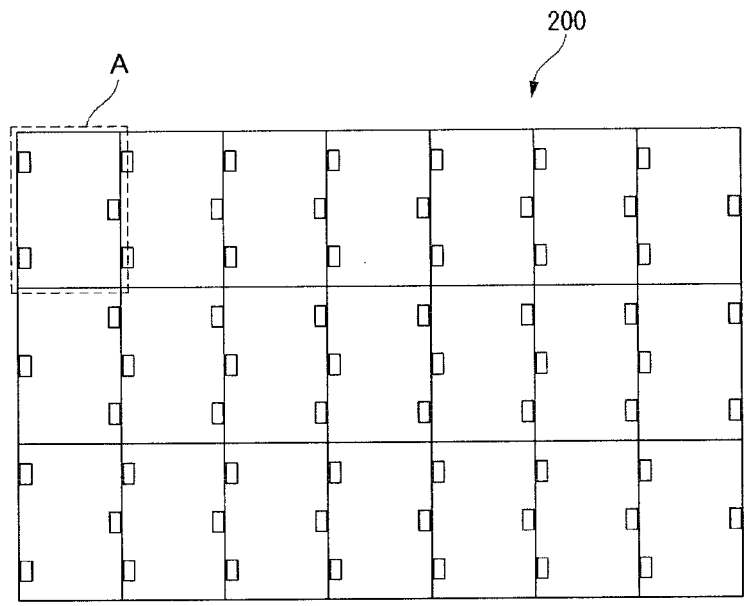

Meanwhile, the arrangement of the optical assemblies A and the light sources 220 as shown in FIG. 34 is merely an embodiment of the present invention, and, therefore, the present invention is not limited thereto. For example, the optical assemblies A and the light sources 220 included in the backlight unit 200 may have configuration as shown in FIG. 35.

Figure 36:
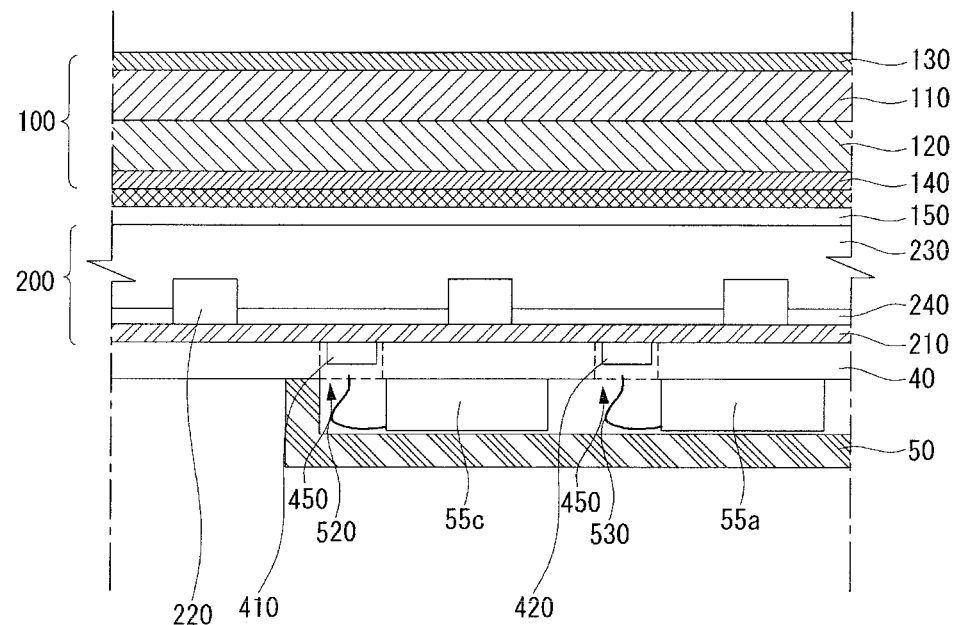
FIG. 36 is a cross sectional view showing an embodiment for a method of connecting between a display module and a driving unit.

FIG. 36 is a cross-sectional view showing the configuration of a display apparatus according to an embodiment of the present invention, in the configuration of the display apparatus shown in the figure, the same parts as those described with reference to FIGS. 1 to 21 are not described below.

Referring to FIG. 36, a display panel 100 including a color filter substrate 110, a TFT substrate 120, an upper polarizer 130, and a lower polarizer 140 and a backlight unit 200 including a first layer 210, a plurality of light sources 220, and a second layer 230 may be disposed in close contact with each other.

For example, an adhesive layer 150 is provided between the backlight unit 200 and the display panel 100, such that the backlight unit 200 can be bonded and fixed to the lower surface of the display panel 100.

In more detail, the upper surface of the backlight unit 200 can be bonded to the lower surface of the lower polarizer 140 by the adhesive layer 150. The backlight unit 200 may further include a diffusion sheet (not shown) and the diffusion sheet (not shown) may be disposed in close contact to the upper surface of the second layer 230. In this configuration, the adhesive layer 150 may be provided between the diffusion sheet (not shown) of the backlight unit 200 and the lower polarizer 140 of the display panel 100.

Furthermore, a back cover 35 may be disposed beneath the backlight unit 200 and the back cover 35 may be formed in close contact to the lower surface of the first layer 210.

Meanwhile, the display apparatus may include a display module 20, in detail, a power supplier 55 that supplies driving voltage to the display panel 100 and the backlight unit 200, and for example, the light sources 220 of the backlight unit 200 can be driven to emit light by the voltage supplied from the power supply unit 55c.

The power supply unit 55c may be disposed in and fixed to the back cover 35 to cover the rear side of the display module 20 to be stably supported and fixed.

According to an embodiment of the present invention, a first connector 410 may be formed on the rear surface of the first layer 210, and for this, a hole 450 into which the first connector 410 is inserted may be formed in the back cover 35.

The first connector 410 electrically connects the light source 220 with the power supply unit 55c to allow driving voltage to be supplied from the power supply unit 55c to the light source 220.

For example, the first connector 410 may be disposed beneath the first layer 210 and connected with the power supply unit 55c through a first cable 520 to deliver driving voltage supplied from the power supply unit 55c to the light source 220 through the first cable 520.

An electrode pattern (not shown), for example, a carbon nanotube electrode pattern may be formed on the first layer 210. The electrode formed on the upper surface of the first layer 210 can electrically connect the first connector 410 with the light source 220, in contact with the electrode formed in the light source 220.

Further, the display apparatus may include a driving control unit 55c for controlling the driving of the display panel 100 and the backlight unit 200, and for example, the driving control unit 55c may be a timing controller.

The timing controller controls the driving timing of the display panel 100, and in detail, creates signals for controlling the driving timings of a data driving unit (not shown), a gamma voltage generating unit (not shown), and a gate driving unit (not shown) included in the display panel 100 and transmits the signals to the display panel 100.

Meanwhile, the timing controller can supply a signal for controlling the driving timing of the light sources 220 to drive the backlight unit 200, in detail, the light sources 220, to the backlight unit 200, when the display panel 100 is driven.

As shown in FIG. 36, the driving control unit 55a may be disposed in and fixed to the back cover 35 disposed in the rear surface of the display module 20 to be stably supported and fixed.

According to an embodiment of the present invention, a second connector 420 may be formed on the substrate 210, and for this configuration, a hole into which the second connector 420 is inserted may be formed in the back plate 50.

The second connector 420 electrically connects the first layer 210 with the driving control unit 55a to allow a control signal outputted from the driving control unit 55c to be supplied to the first layer 210.

For example, the second connector 420 may be disposed beneath the first layer 210 and connected with the driving control unit 55c through a second cable 530 to deliver a control signal supplied from the driving control unit 55c to a light source driving unit through the second cable 530.

Meanwhile, the light source driving unit (not shown) may be formed on the first layer 210 and can drive the light sources 220, using the control signal supplied from the driving control unit 55c through the second connector 420.

In addition, the power supply unit 55c and the driving control unit 55a as described above are covered by a driving unit cover 40 to be protected from the outside.

The configuration of the display apparatus shown in FIG. 36 is provided just as an embodiment and accordingly, if needed, it is possible to change the position and the number of the power supply unit 55c, the driving control unit 55a, the first and second connectors 410 and 420, and the first and second cables 520 and 530.

Figure 37:
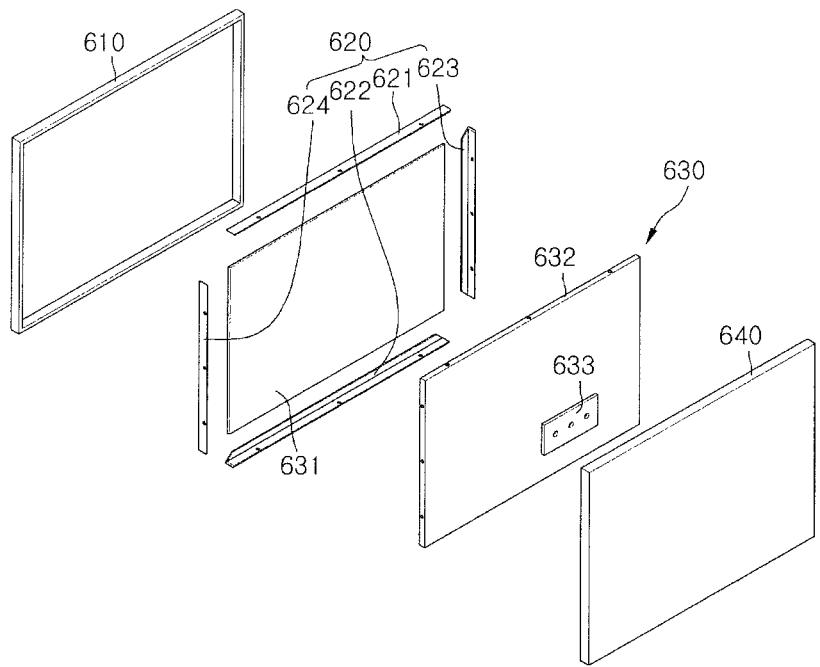
FIG. 37 is an exploded perspective view schematically showing main configurations of a display apparatus.

FIG. 37 is an exploded perspective view schematically showing main configurations of a display apparatus;

Referring to FIG. 37, the display apparatus 61 includes a display panel on which images are displayed, a backlight unit 632 which provides light sources for the display panel 631, a driving unit 633 which drives the display panel 631 and the backlight unit 632 in response to external signals, a front panel 610 which surrounds the display panel 631 and the backlight unit 632, a rear surface cover 640 and a supporting member 620 which supports the display panel 631 and the backlight unit 632 against the front panel 610.

More specifically, the display panel 631 according to this embodiment may be, for example, a TFT-LCD (Thin film transistor liquid-crystal display) panel, and the backlight unit 632 may include, for example, a CCFL (cold cathode fluorescent lamp) or a LED (light emitting diode) as a light source.

Furthermore, the plurality of light sources of the backlight unit 632 according to this embodiment may be configured to be selectively turned on or turned off according to video signals, thereby maximizing the video contrast ratio of the display panel 631. Furthermore, as the plurality of light sources is selectively turned on or turned off, a light guide panel that guides and diffuses the light of the light sources in a predetermined direction may be provided in the state separated as a separate segment according to the light sources.

Furthermore, in this embodiment, a component including the display panel 631 and the back right unit 632 is referred to as a display module 630.

Meanwhile, the front panel according to this embodiment may made of a transparent material, for example, an injection-molded transparent plastic, or a tempered glass. The plastic material that is applicable to the front panel 631 according to this embodiment includes, for example, Poly Carbonate (PC:) or Poly Methyl Meta Acrylate (PPMA).

The front panel 610 is formed such that its four edges are curved toward the rear thereof to form a space in which the display panel 631 and at least some of the backlight unit 632 can be accommodated. Furthermore, the supporting member 620 to support the display panel 631 and the backlight unit 632 against the front panel 610 are bonded to the rear surface of the front panel 610

The supporting member 620 may include upper and lower supporting members 621 and 622 and left and right supporting members 623 and 624, may be formed by extrusion molding a metal material, for example, aluminum, and may be formed in the shape of a plate, one side of which is curved. Furthermore, the supporting member may be formed in the shape of a plate, in which a color material, for example, a block material, is deposited, that is, having a predetermined color.

In this case, the upper and lower supporting members 621 and 622 may be formed to be extended to a length corresponding to the length of the upper and lower edges of the display panel 631 and the backlight unit 632, and the left and right supporting members 623 and 624 may be formed to be extended to a length corresponding to the length of the left and right edges of the display panel 631 and the backlight unit 632

Furthermore, a number of supporting members 621, 622, 623 and 624 are formed in sizes corresponding to the sizes of the edges of the display panel 631, and are bonded and fixed to the rear surface of the front panel 610 with theirs ends engaged with the ends of display panel. That is, in the state in which the number of supporting members 621, 622, 623 and 624 are fixed to the rear surface of the front panel 610, the interior space of the supporting members 621, 622, 623 and 624 included in the display panel 631 may be defined by a single closed loop.

Although the supporting member 620 is described as the configuration composed of a number of bracket structures in this embodiment, a configuration composed of a single bracket structure may be also included in this embodiment.

Meanwhile, the rear surface cover 640 to form the rear surface of the display apparatus 61 may be provided in the rear of the display module 630. The rear surface cover 640 covers the rear of the display module 630 to protect the display module 630 when being fixed to the display module 630. Furthermore, the rear surface cover 640 may further include a shield member to shield electromagnetic waves emitted from the display module 630 or may be made of a metal material to shield electromagnetic waves by itself.

The configuration in which the supporting member 620 is fixed to the front panel 610 is described in detail below.

Figure 38:
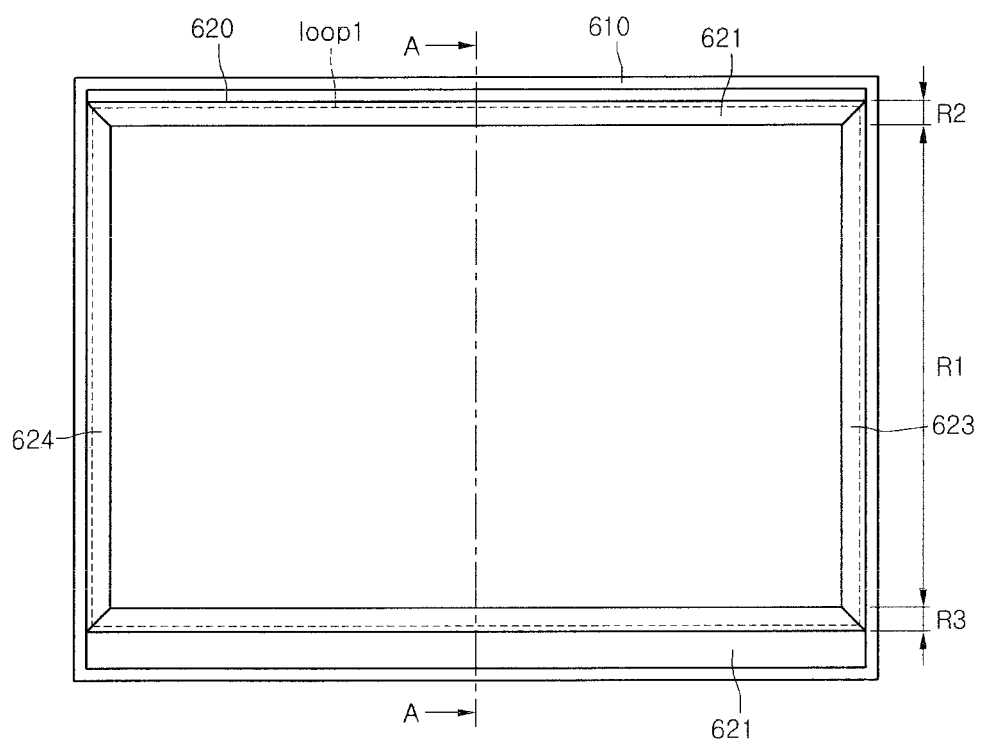
FIG. 38 is a diagram showing an embodiment for the front structure of the display apparatus.
Figure 39:
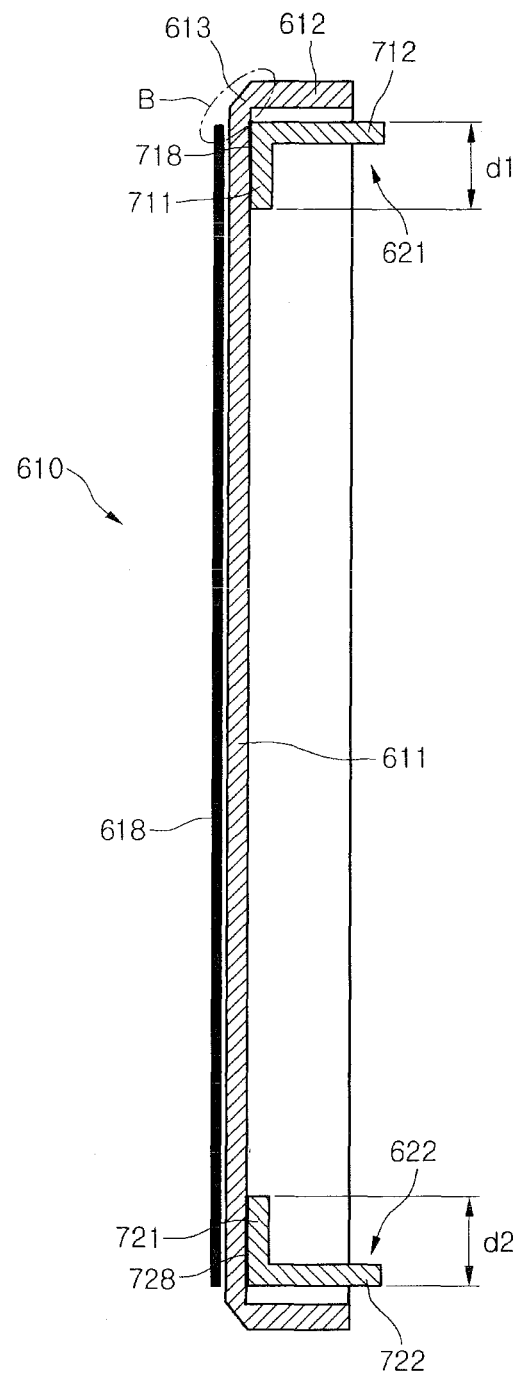
FIG. 39 is a cross sectional view showing the configuration of the display apparatus according to a fourth embodiment of the present invention.

FIG. 38 is a diagram showing an embodiment for the front structure of a display apparatus which illustrates the state in which the supporting member is fixed to the rear surface of the front panel of the FIG. 37. FIG. 39 is a cross-sectional view taken along line A-A of FIG. 38, which shows the cross sectional view of the configuration of a display apparatus according to a fourth embodiment of the present invention. Furthermore, FIG. 4 is a perspective view showing an embodiment of the detailed configuration of the supporting member.

Figure 40:
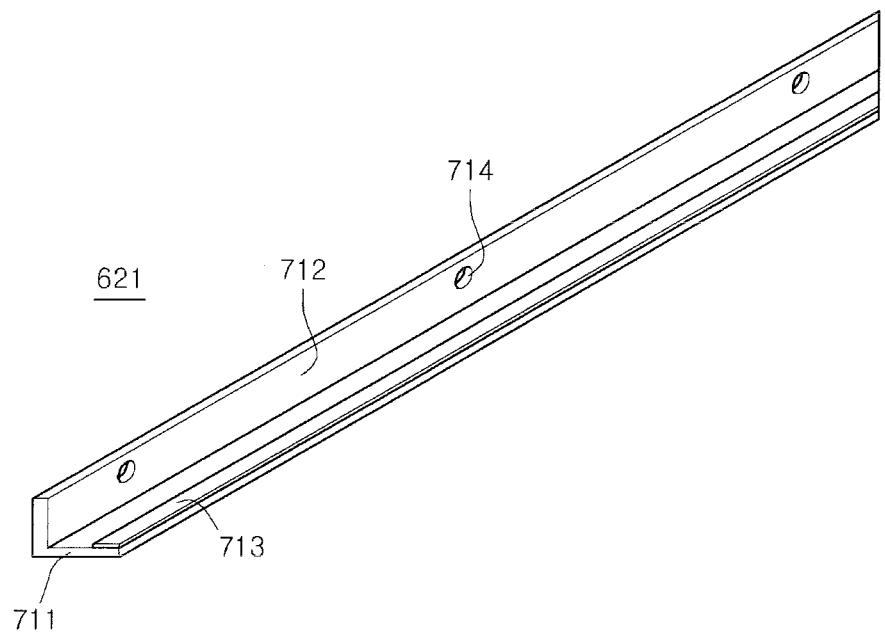
FIG. 40 is a perspective view showing an embodiment for the configuration of a supporting member.

Referring to FIGS. 38, 40, the supporting member 620 is fixed to the rear surface of the front panel 610 made of a transparent material, and at least some thereof may be exposed forwardly to the outside.

Furthermore, the supporting member 620 are bonded and fixed to the rear surface of the front panel 610 with the ends of the supporting members 621, 622, 623 and 624 engaged with the ends of display panel, thereby forming a single closed loop (loop1).

Meanwhile, according to an embodiment of the present invention, some of the number of supporting members 621, 622, 623 and 624, for example, the upper and lower supporting members 621 and 622 are only bonded and fixed to the rear surface of the front panel 610 and the rest, that is, the left and right supporting members 623 and 624 may not fixed to the front panel 610.

The display panel 631 and the backlight unit 632 are located in the closed loop (loop1), and the backlight unit 623 is fixed to the supporting member 620 to be supported against the front panel 610.

In this case, the upper supporting member 621 may be configured to include a seating portion 711 fixed to the rear surface of the front panel 610, against which at least a part of the display panel 631 is supported, and a first curved portion 712 formed to be curved from the seating portion 711 in a rear direction, to which the display module 630 is fixed.

Both ends of the first seating portion 711 may be formed to be tilted at a predetermined angle so as to be engaged with the ends of the left and right supporting members 623 and 624. Furthermore, a caution member 713 to allow the edges of the display panels 631 to be stably seated is provided in one surface of the first seating portion 711, that is, a surface located in a direction in which the first curved portion 712 is curved, and the back surface of the first seating portion 711 may be bonded and fixed to the rear surface of the front panel 610.

For example, the first curbed portion 712 may by formed to be curved in a direction perpendicular to the first seating portion 711 so as to surround the side edges of the display module 630. The length to which the first curved portion 712 is formed to be extended may be longer than the length along which the edge part 612 of the front panel 610 is curved from the body of the front panel 611.

Furthermore, fastening holes 714 which fastening members to fix the display unit 630, in detail, the backlight unit 632 pass through are formed in the first curved portion 712, and the fastening holes 714 may be formed at locations which are more spaced than the height of the end of the edge part 612.

Meanwhile, a second seating portion 721 and a second curved portion 722 may be formed in the lower supporting member 622 like the upper supporting member 622. Furthermore, the left and right supporting members 623 and 624 may be respectively configured to include a seating portion and a curved portion as described above.

In addition, the upper supporting member 621 and the lower supporting member 622 are formed respectively in a symmetrical shape to each other such that the first curved portion 712 and the second curved portion 722 are opposite to each other. That is, the upper and lower supporting members 621 and 622 are provided such that the first curbed portion 712 defines the upper edge of the closed loop, and the second curved portion 722 defines the lower edge of the closed loop. In this case, the first seating portion 711 and the second seating portion 721 are located in the interior space of the closed loop (loop1).

Meanwhile, the width d1 of the first seating portion 711 and the width d2 of the second seating portion 721 may be identical to each other and accordingly, upper and lower regions for a bezel having the same width may be implemented. In contrast, the width d2 of the second seating portion 721 may be set to be larger than the width d1 of the first seating portion 711.

That is, the second curved portion 722 formed to be curved from the second seating portion 721 is a part on which the lower edge of the backlight unit 632 is fixed to and supported on when the display apparatus has been mounted, and the dead weight of the backlight unit 632 and the fastening force with the backlight unit 32 are applied thereon. The second seating portion 721 has to simultaneously support the dead weight and the fastening force.

Accordingly, since the second seating portion 721 has to secure a supporting force greater than that of the first seating portion 711 on which the dead weight of the backlight unit 632 is not directly applied, the width d2 of the second seating portion 721, that is, the bonding and fixing portion for the front panel 610 may be formed to be larger than the width d1 of the first seating portion 711.

Meanwhile, a bonding member 718 is provided in the back surfaces of the first seating portion 721 and the second seating portion 722 to allow the first seating portion 721 and the second seating portion 722 to be fixed to the rear surface of the front panel 610.

The bonding member 718 may be implemented using UV curable resin, for example, Epoxy resin. In the case in which the bonding member 718 is implemented using UV curable resin, when the bonding member 718 is provided on the back surface of the first seating portion 721, the upper supporting member 621 is located on the rear surface of the front panel 610, and then UV rays are transmitted through the front panel 610 made of a transparent material, thereby easily curing the bonding member 718.

Furthermore, in order to prevent the bonding member 718 from being exposed to the front surface of the display apparatus 61, a light-shielding pattern, for example, a black printing layer may be formed between the rear surface of the front panel 610 and the bonding member 718.

Meanwhile, the front panel 610 forms the edges of the body 611 of the front panel formed in a plane and the front panel 610, and may include an edge part 612 formed to be curved toward the rear side of the front panel 610.

A video display region is formed in the body 611 of the front panel and the video displayed on the display panel 631 transmits the video display region and can be shown from the outside.

Furthermore, a film layer 618 is provided in a part corresponding to the video display region of the body 611 of the front panel 610, and, accordingly, scratch, scattered reflection, or the like of the front panel 610 may be prevented.

Figure 41:
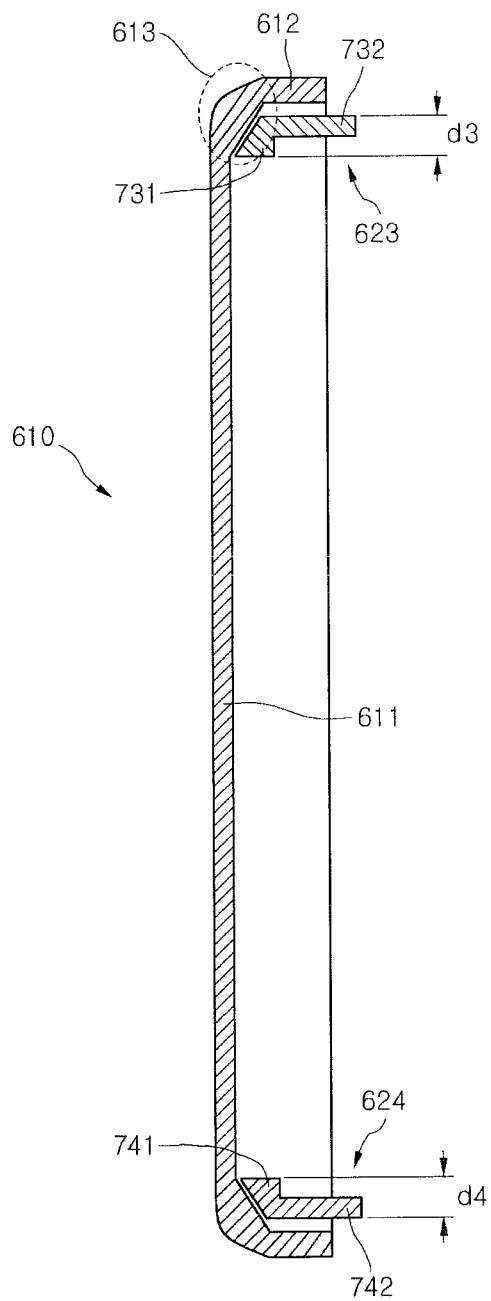
FIG. 41 is a block diagram showing the configuration of a display apparatus according to a fifth embodiment of the present invention.
Figure 42:
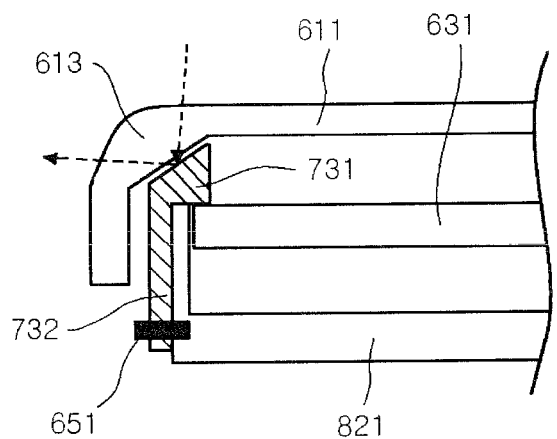
FIG. 42 is a diagram specifically showing the configuration of the display apparatus shown in FIG. 41.

FIG. 41 is a cross-sectional view showing the configuration of a display apparatus according to a fifth embodiment of the present invention, and the configuration of the display apparatus shown in FIG. 41, the same parts as those described with reference to FIGS. 37 to 40 are not described below. FIG. 42 is an enlarged view enlarging a part of the configuration of the display apparatus shown in FIG. 41.

Referring to FIGS. 41 and 42, the edge part 612 of the front panel 610 may include a reflection region 613 having a convex external surface and, as shown in the drawing, the reflection region 613 may be formed around the corners of the front panel 610.

As described above, the reflection region 613 formed on the edge part 612 of the front panel 610 fulfils the same function as a convex mirror, thereby allowing the outer edge region of the display apparatus 61, more specifically, the bezel region to be shown as being smaller than the real from the front.

That is, at least a part of the reflection region 613 of the front panel 610 may be formed at location in which overlaps the supporting member 623.

In this case, by the reflective layer 613 of the front panel 610, the width of the supporting member 623 which is shown to a user from the front of the display apparatus 61 may be shown as being smaller than the real width d3.

Figure 43:
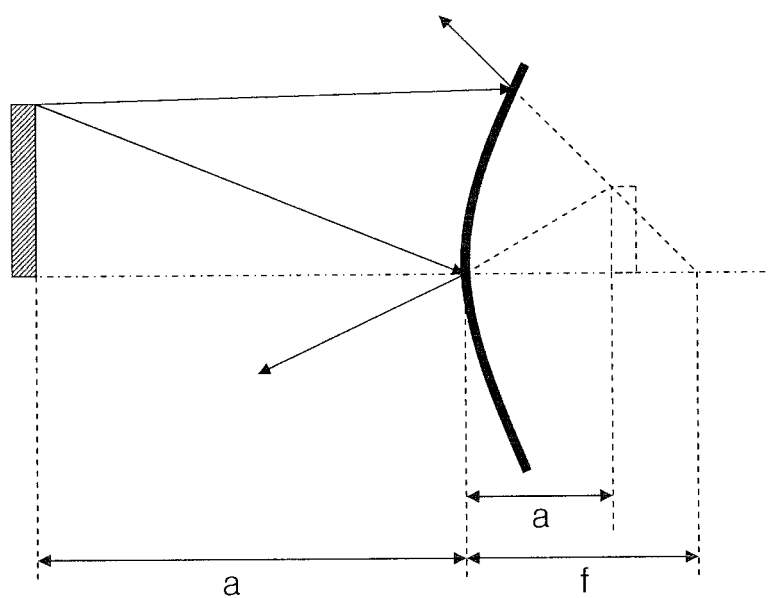
FIG. 43 is a diagram schematically showing the principle of a convex mirror.

When the principle of the convex mirror is described with reference to FIG. 43, the convex mirror is a spherical mirror, of which the outer circumference is a reflective surface, and has a virtual focus to generate a non-inverted virtual image regardless of the location of a object.

Meanwhile, the convex mirror functions to reflect light, and has a virtual focus. The images of an object by the convex mirror are all non-inverted virtual images regardless of the location relationship between the object and the convex mirror.

In order to allow the reflective region 613 of the front panel 610 to fulfill a similar function to the convex mirror as described above, the outer surface of the reflective region 613 has a convex shape and the internal surface has a flat shape.

Meanwhile, in order to allow the reflection region 613 to fulfill the function of the convex mirror without considerably increasing the size of the outer edge region of the display apparatus 61, the outer surface of the reflection region 613 of the front panel 610 may have a curvature of 10 to 20.

Meanwhile, according an embodiment of the present invention, the outer edge region to be shown to a user, that is the width of bezel can be further decreased by decreasing the width d3 of the supporting member 623, more specifically, the width d3 of the seating portion 731.

In this case, the supporting member 623 may be fixed to the front panel 610, for example, as shown in FIGS. 41 and 42, a bonding member is not formed between the seating portion 731 of the supporting member 623 and the rear surface of the front panel 610 and the curved portion 732 may be fixed to the display module, more specifically, a bottom cover 821 through the fixing member 651.

Furthermore, the fixing member 651 is fixed to the bottom cover 821 by passing through the supporting member 623, and may be a screw to fix the display module 610 to the supporting member 623.

The surface adjacent to the reflection region 613, of the front panel 610 of the seating portion 731 of the supporting member 623 may be formed to be parallel to the flat internal surface of the reflection region 613.

According to an embodiment of the present invention, only some of the plurality of supporting members 621, 622, 623 and 624 included in the display apparatus 61 may have the structure as described with reference to FIGS. 41 and 42.

For example, the right an left supporting members 623 and 624 of the plurality of supporting members 621, 622, 623 and 624 have the structure as described with reference to FIGS. 41 and 42, and the rest upper and lower supporting members 621 and 622 may have the structure as described with reference to FIG. 39. In this case, FIGS. 41 and 42 may be cross sectional views taken along line A-A of FIG. 39.

That is, in the upper and lower supporting members 621 and 622, the respective seating portion 711 and 721 are bonded and fixed to the rear surface of the front panel 610 using the bonding member 718, and the respective curved portions 712 and 722 are fixed to the bottom cover 821 to support and fix the display module 620.

Meanwhile, in the left and right supporting members 621 and 622, the respective seating portions 711 and 721 are not fixed to the front panel 610 and the respective curved portions 712 722 are only fixed to the bottom cover 821.

For this, the widths d1 and d2 of the respective seating portions 711 and 721 of the upper and lower supporting members 621 and 622 are formed to be larger than the widths d3 and d4 of the respective seating portions 731 and 741 of the right and left supporting members 623 and 624.

Furthermore, the widths d3 and d4 of the respective seating portions 731 and 741 of the right and left supporting members 623 and 624 is formed to be small and the reflection region 613 as described above is respectively provided in the right and left edge parts 612 of the front panel 610, thereby decreasing the left and right edge regions of the display apparatus 61 shown to a user from the front thereof, that is, the width of the bezel region.

Figure 44:
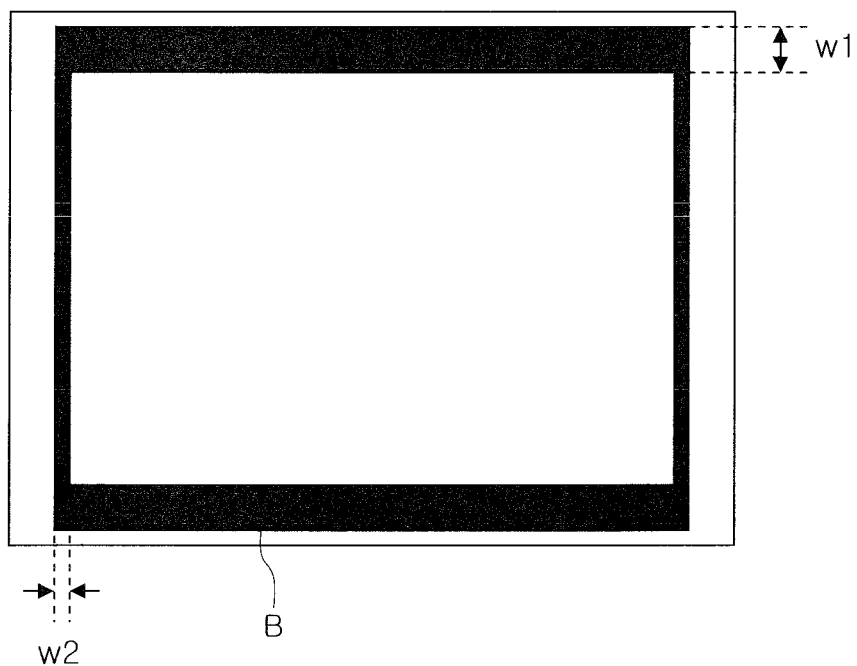
FIG. 44 is a plan view showing an embodiment for the front structure of the display apparatus.

That is, referring to FIG. 44, a bezel region B formed to respectively correspond to the supporting members 621, 622, 623 and 624 may be provided in the edge region of the display apparatus 61, for example, the non-display region.

The bezel region B may be formed such that the supporting members 621, 622, 623 and 624 are exposed to the outside toward the front thereof through the front panel 610 or a black printing layer or the like is formed on the rear surface of the front panel 610 to correspond to the locations of the supporting members 621, 622, 623 and 624.

Figure 45:
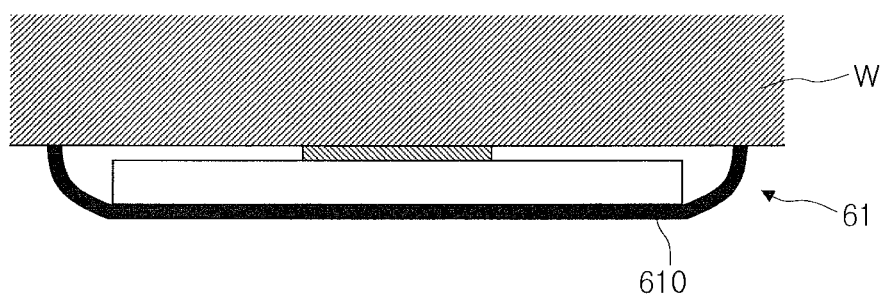
FIG. 45 is a diagram showing a case in which the display apparatus is fixed to a wall.

As described above, the widths d1 and d2 of the respective seating portions 711 and 721 of the upper and lower supporting members 621 and 622 are larger than the widths d3 and d4 of the respective seating portions 731 and 741 of the right and left supporting members 623 and 624 and the reflection region 613 as described above is respectively provided in the right and left edge parts 612 of the front panel 610, so that the width w2 of the left and right bezel regions of the display apparatus 61 to be shown to a user from the front thereof is shown as being smaller than width w1 of the upper and lower bezel regions as shown in FIG. 45.

The reason for this is that when width w2 of the left and right bezel regions of the display apparatus 61 is shown as being smaller than width w1 of the upper and lower bezel regions as shown in FIG. 45, a user feels that the video display region of the display apparatus 61 is larger than the real.

FIG. 45 shows the state in which the display apparatus is fixed to a wall surface, and the configuration of the display apparatus shown in FIG. 41, the same parts as those described with reference to FIGS. 37 to 40 are not described below.

Referring to FIG. 45, the display apparatus 61 may be fixed to a wall surface W by a wall mount.

In this case, according to an embodiment of the present invention, the edge part curved toward the rear side of the front panel 610 is formed to be adjacent to, more preferably, in close contact to the wall surface W. Accordingly, there is an advantage in that the front surface of the display apparatus 61 is shown as being smoother.

Although the configuration of the display apparatus of the embodiment of the present invention is described such that the edge part 612 of the front panel 610 includes the reflection region 613 playing the role of the convex mirror, the present invention is not limited thereto.

That is, the edge part 612 of the front panel 610 may include a region to allow an object of interest to be shown smaller than actual size in addition the convex mirror, for example, the edge part 612 may include a region performing the function of a concave lens, a Fresnel lens or the like in the corners of the display apparatus 61.

The Fresnel lens is a lens that retains the same optical characteristics as the convex lens and the concave lens but is much smaller in thickness. More specifically, a convex Fresnel lens may be fabricated by cutting an upright convex lens into a plurality of horizontal segments (parallel with the direction of an incident light beam) and moving the segments horizontally. Thereafter, the rounded refraction surface (having a convex lens profile) of each segment is flattened into a prism shape. By flattening the rounded surface of the convex lens in this way, the chromatic aberration and thickness of the Fresnel lens may be reduced.

Figure 46:
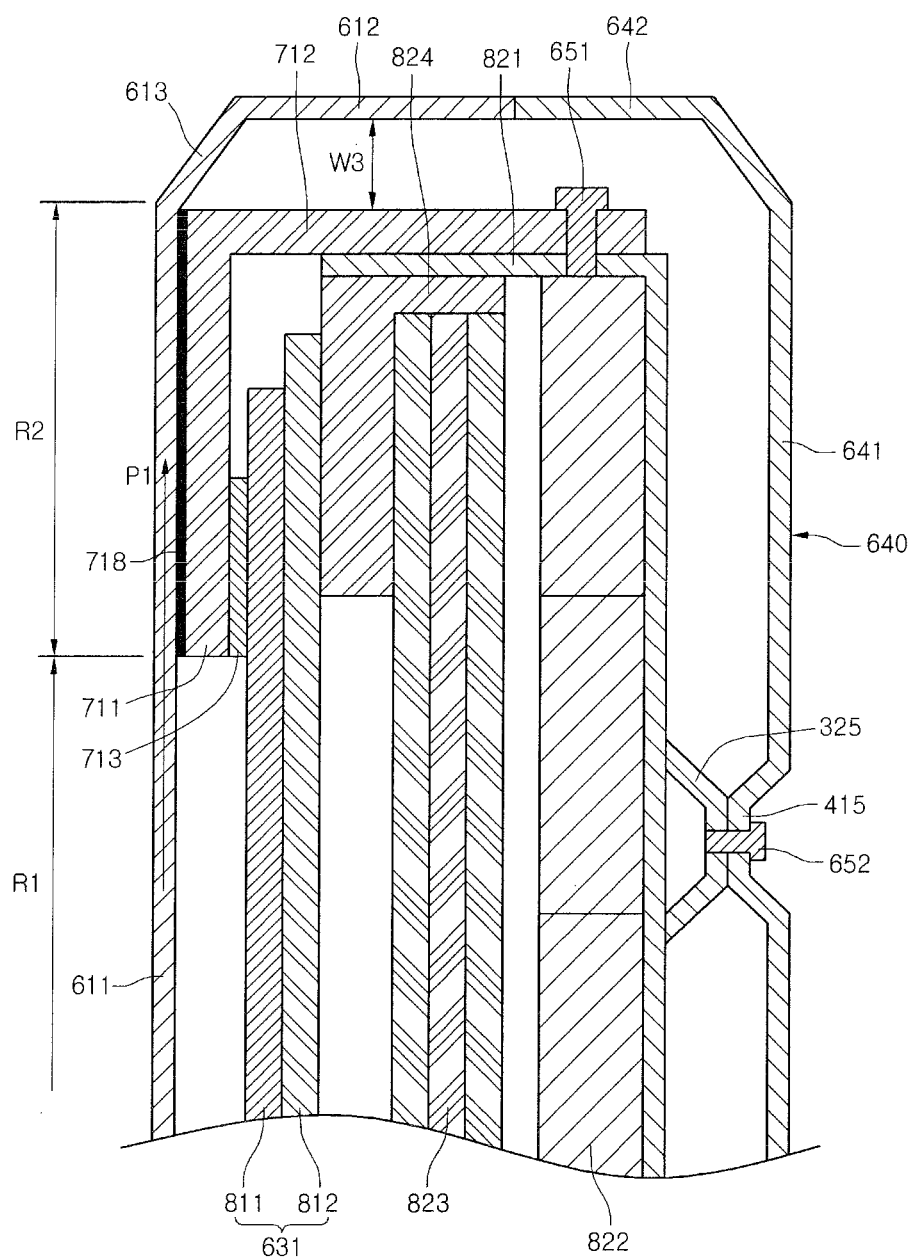
FIG. 46 is a block diagram showing the configuration of a display apparatus according to a sixth embodiment of the present invention.

FIG. 46 is a cross-sectional view showing the configuration of a display apparatus according to a sixth embodiment of the present invention, and the configuration of the shown display apparatus , the same parts as those described with reference to FIGS. 37 to 45 are not described below.

Referring to FIG. 46, the backlight unit 632 of the display apparatus 630 according to the present invention may include a bottom cover 821 that forms the body of the backlight unit 632, an optical assembly 822 that is accommodated in the bottom cover 821 and emits light forwardly, a plurality of optical sheets 823 that allows light emitted from the optical assembly 822 to be diffused at uniform illuminance and a panel guide 824 that supports the display panel 631 at a rear side.

The bottom cover 821 is formed in the shape of a box, of which one side is opened, and in which the optical assembly 822 is accommodated, and the optical sheet may be fixed to the opened side.

Furthermore, the driving unit 633 for driving the display module 630 may be fixed to the rear surface of the bottom cover 821, and a rear surface cover (not shown) may be located in the back surface of the bottom cover unlike that shown in the FIG. 46.

The optical assembly 822 may be configured to include a plurality of light sources, such as LED, and a plurality of light guide panels to allow light emitted from the respective light sources to be diffused in a front side.

Furthermore, the display panel 631 may include a first substrate 811 and a second substrate 812 between which liquid crystal is interposed, and the respective edges of the first substrate 811 and the second substrate 812 may be fixed to each other by a bonding member, such as UV curable resin, when the liquid crystal has been interposed between the first substrate 811 and the second substrate 812.

In this case, the front edge of the first substrate 811 is seated in the caution member 713 of the supporting member 612 and supported in a back side, and the rear surface edge of the second substrate 812 is supported by the panel guide 824 in a front side, so that the display panel 631 is firmly retained at its location.

A process of assembling the display apparatus 61 according to this embodiment is described below.

First, the supporting member 620 is fixed to the edge of the rear surface of the front panel 610. In this case, the respective supporting members 621, 622, 623 and 624 are arranged such that their ends formed to be tilted are engaged with each other, and bonded and fixed to the rear surface of the front panel 610 in the state in which the bonding member is respectively provided in the back surfaces of the respective seating members.

Thereafter, the display panel 631 and the backlight unit 632 are seated in the inside of the closed loop (loop1) formed by the supporting member 620.

Next, the fixing member 651, such as a screw, is fixed to the side edge part of the backlight unit 632 by passing through the curved portion 721 of the supporting member 620. When the backlight unit 632 has been fixed to the supporting member 620, the front edge of the display panel 631 is supported by the supporting member 620, and the rear surface edge is supported by the panel guide 824, thereby firmly supporting the display panel 631.

In this case, the front surface of the display panel 631 is disposed to be spaced from the rear surface of the body 611 of the front panel at a predetermined distance, and the spaced distance is determined by the thickness of the cross section of the supporting member 620.

Meanwhile, the curved portion 712 is disposed in a direction perpendicular to a plane in which the body 611 of the front panel 610 is formed and the supporting member 651 passes through the curved portion 712 in a direction perpendicular to the curved portion 712. Accordingly, the fixing member 651 can provide a fastening force in a direction perpendicular to the curved portion 712, that is, a direction parallel to the plane in which the body 611 of the front panel.

The fastening force by the fixing member 651 may be provided as a tensile force generated from the center of the plane of the body 611 of the front panel toward the outside. Accordingly, the body of the front panel 611 is strained in the direction of outer edge of the body 611 of the front panel, thereby preventing the center of the plane of the body 611 of the front panel from being bended forward or backward.

Thereafter the rear surface cover (not shown) is arranged at and fixed to the back of the backlight unit 632 to shield the back of the backlight unit 632.

According to the proposed embodiment, the display panel 631 and the backlight unit 632 are directly fixed to and supported on the supporting member 620 disposed in the rear surface of the front panel 610, so that a separate fixing structure to fix the display panel 631 and the backlight unit 632 may be removed, thereby decreasing the width of the edge of the display apparatus 61, that is, the width of the bezel, the front-back width and entire weight.

FIGS. 47 to 50 are cross-sectional views showing another embodiment of the configuration of a display apparatus according to the present invention, in the configuration of the display apparatus shown in the figure, the same parts as those described with reference to FIGS. 37 to 46 are not described below.

Figure 47:
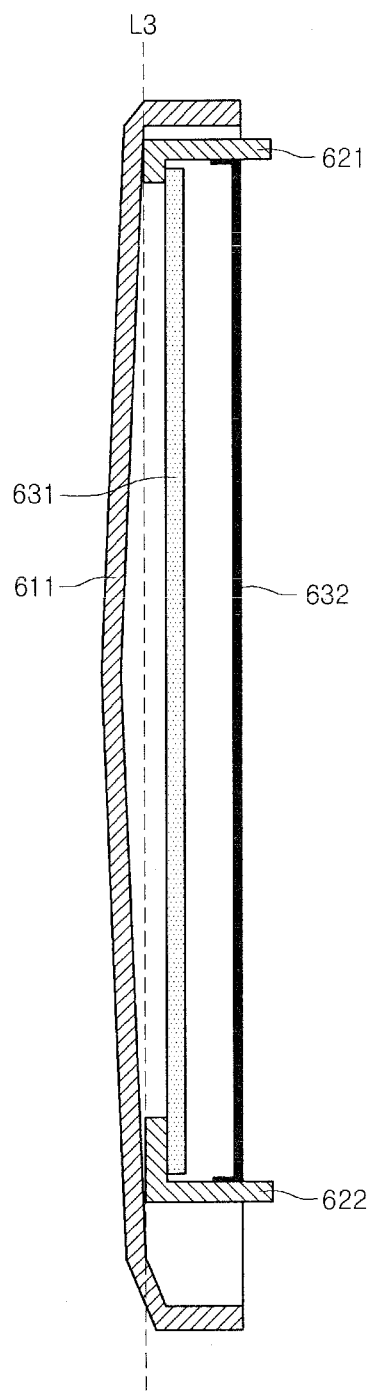
FIGS. 47 and 50 are cross-sectional views showing other embodiments for the configuration of the display apparatus according to the present invention.

Referring to FIG. 47, when heat is delivered to the body 611 of the front panel through the display panel 631, forward/backward displacement at the center part of the body 611 of the front panel is larger than that at the edge of the body of the front panel 611 in which the supporting member 620 is provided as described above Accordingly, the body 611 of the front panel of the display apparatus 61 according to this embodiment may be formed such that the center part is more spaced forwardly compared to the edge.

More specifically, the center part of the body 611 of the front panel is provided to be more spaced forwardly than the edge, and the spaced distance may be formed in a size corresponding to the distance at which the edge of the body 611 of the front panel is spaced from the display panel 611.

For example, in the initial state, the distance at which the center part of the body 611 of the front panel 611 is spaced from the display panel 611 may be set be two times the distance at which the edge of the body 611 of the front panel is spaced from the display panel 611.

Furthermore, in order to minimize video distortion due to different spaced distances, the body 611 of the front panel may be formed in a shape smoothly tilted from the center part to the edge, that is, a shape finely rounded at a predetermined curvature.

Figure 48:
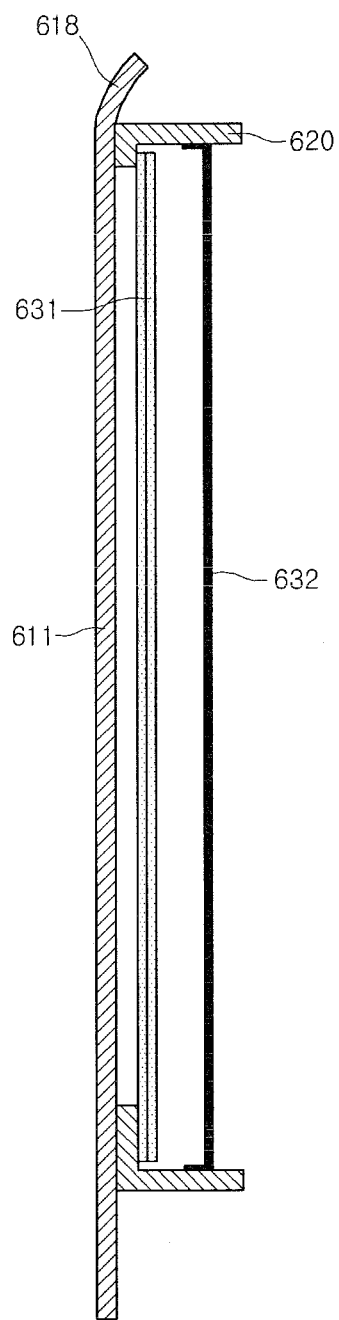

Referring to FIG. 48, the front panel 610 of the display apparatus according to this embodiment may further include a rounded edge part 618. More specifically, the rounded edge part 618 is provided in the upper edge part of the front panel 610 and may be formed to be gradually rounded.

Although it is described that the rounded edge part 618 is provided in the upper edge of the front panel 610 in this embodiment, it is also possible that the rounded edge part 618 is formed in the lower edge and/or side edge of the front panel 610.

Figure 49:
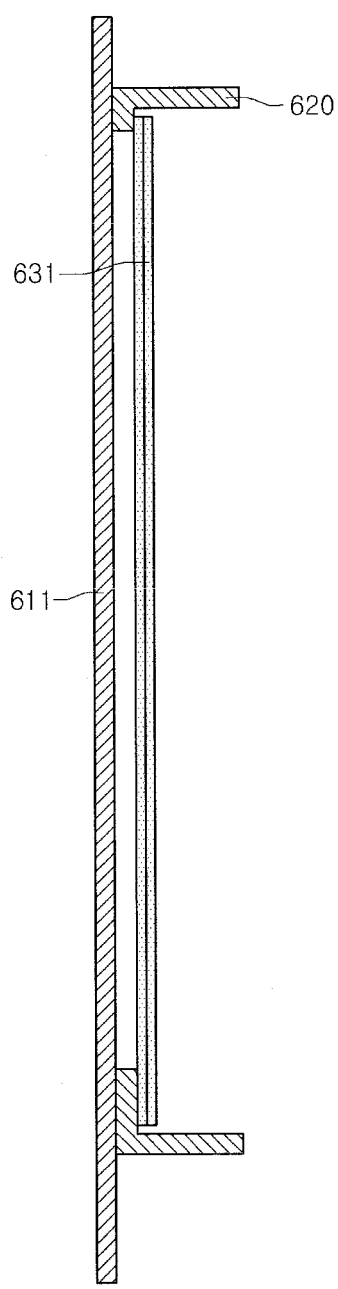

Referring to FIG. 49, the edge of the front panel 610 of the display apparatus according to this embodiment may form the same plane as the body 611 of the front panel. Unlike the other embodiments, the edge of the front panel 610 according to this embodiment is not formed in a curved shape, and is located on a plane parallel to the body 611 of the front panel.

Figure 50:
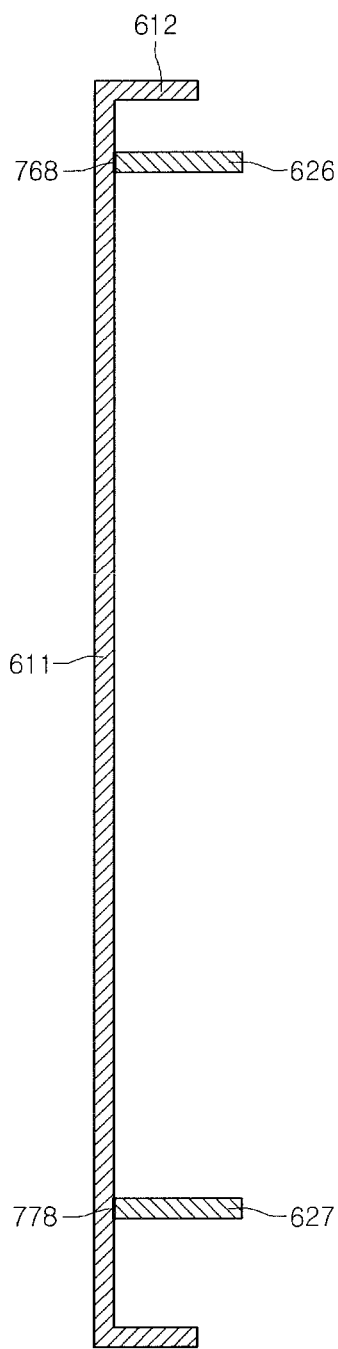

Referring to FIG. 50, the supporting member according to this embodiment may be formed in a plate shape perpendicular to the rear surface of the body 611 of the front panel 611. More specifically, the supporting member may include a upper supporting member 626, and a side supporting member (not shown).

The supporting member may be formed in the shape of a plate to cover the edges of the liquid crystal panel and the backlight unit, and may be disposed in a direction perpendicular to the rear surface of the body 611 of the front panel.

Furthermore, the boding members 768 and 778 are provided in one side of the supporting members to bond and fix the supporting members to rear surface of the front panel 611.

According to the display apparatus according to the embodiment of the present invention, a transparent bezel having a width that gradually decreases in a back side is provided in the edge region of the display apparatus, thereby the appearance of the display apparatus. Furthermore, the rigidity of the display apparatus can be secured using one or more bars which stably fix the structures of the display apparatus.

Furthermore, the size of the outer edge region of the display apparatus to be shown to a user can be decreased by forming a reflection region that fulfills the same function as a convex mirror in the edge part of the front panel.

Furthermore, the backlight unit is disposed in close contact to the display panel thereby simplifying the manufacturing process for the display apparatus and, at the same time, decreasing the thickness of the display apparatus. Furthermore, the backlight unit is disposed such that a plurality of light sources emit light at different directions, thereby providing light of uniform luminance to the display panel, and therefore, improving the quality of display video.

Although the present invention was described in the above with reference to the preferred embodiments, the embodiment are provided just as examples and do not limit the present invention. Further, the present invention may be modified and applied in various ways not exemplified in the above within the spirit and scope of the present invention by those skilled in the art. For example, the components described in detail in the embodiments of the present invention may be modified. Further, differences in the modification and application should be construed as being included in the scope of the present invention, which is defined in the accompanying claims.

What is claimed is:

1. A display apparatus comprising:
    a display module;
    a front panel disposed on a front of the display module;
    a first supporting member including a first part having a first surface facing a front side of the display apparatus and a second part having a second surface facing a lateral side of the display apparatus, the first surface of the first part of the first supporting member being fixed to the front panel and the second surface of the second part of the first supporting member being fixed to the display module; and
    a bezel formed on an outer edge region of the display apparatus to surround an edge of the front panel,
    wherein the first part of the first supporting member extends outward from a front end portion of the second part.

2. The display apparatus of claim 1, further comprising a bonding member formed between the first surface of the first supporting member and the front panel.

3. The display apparatus of claim 2, further comprising a light-shielding pattern formed on a rear surface of the front panel, wherein the bonding member is formed at locations which partially overlap the light-shielding pattern.

4. The display apparatus of claim 1, further comprising a fixing member configured to fix the display module to the second surface of the first supporting member.

5. The display apparatus of claim 4, further comprising a back cover configured to cover a rear side of the display module, wherein the fixing member fixes the back cover to the second surface of the first supporting member.

6. The display apparatus of claim 5, wherein the fixing member is a screw fixed to the back cover to pass through the second surface of the first supporting member.

7. The display apparatus of claim 1, further comprising:
    a back cover configured to cover a rear side of the display module; and
    a fixing member configured to fix the back cover to the second surface of the first supporting member.

8. The display apparatus of claim 7, wherein the fixing member is a screw fixed to the second surface of the first supporting member to pass through the back cover.

9. The display apparatus of claim 1, wherein the first supporting member is configured of an aluminum extruded bar.

10. The display apparatus of claim 1, further comprising a second supporting member coupled to the first supporting member.

11. The display apparatus of claim 10, wherein the second supporting member covers a rear side of the first supporting member.

12. The display apparatus of claim 10, wherein the second supporting member includes a first surface and a second surface formed in directions perpendicular to each other, wherein the first surface of the second supporting member is coupled to the first surface of the first supporting member, and the second surface of the second supporting member is coupled to the second surface of the first supporting member.

13. The display apparatus of claim 1, wherein a width of the bezel has gradually decreases toward a rear side thereof.

14. The display apparatus of claim 1, wherein the bezel made of a transparent material.

15. The display apparatus of claim 1, wherein a thickest part of the bezel is 2.7 times to 6.5 times a thickness of the front panel.

16. The display apparatus of claim 1, further comprising seating grooves formed on the bezel and configured to support edges of the front panel.

17. The display apparatus of claim 1, wherein the bezel includes a first region having a substantially uniform width and a second region having a width gradually decreasing toward a rear side, and the second region of the bezel has a shape titled at 45 degrees to 60 degrees.

18. The display apparatus of claim 1, wherein the bezel has convex or concave patterns formed on a rear surface thereof.

19. The display apparatus of claim 1, wherein a rear surface of the front panel is treated using etching or film laminating.

20. The display apparatus of claim 1, wherein the front panel includes an edge part that is curved toward a rear side of the display apparatus, the edge part including a reflective region having a convex external surface and a flat internal surface.

21. A display apparatus, comprising:
    a display module;
    a front panel provided at a front of the display module; and
    a first supporting member including a plurality of surfaces formed in directions perpendicular to each other, a first surface of the plurality of surfaces being fixed to the front panel and a second surface of the plurality of surfaces being fixed to the display module,
    wherein an edge part of the front panel is curved back toward a rear side of the display apparatus, the edge part including a reflective region having a convex external surface and a flat internal surface.

* * * * *